United States Patent
Hirata et al.

(10) Patent No.: US 8,427,790 B2
(45) Date of Patent: Apr. 23, 2013

(54) THIN FILM MAGNETIC HEAD HAVING SIMILARLY STRUCTURED RESISTIVE FILM PATTERN AND MAGNETIC BIAS LAYER

(75) Inventors: Kei Hirata, Tokyo (JP); Kazuki Sato, Tokyo (JP); Yohei Koyanagi, Tokyo (JP); Takayasu Kanaya, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 1029 days.

(21) Appl. No.: 12/216,162

(22) Filed: Jun. 30, 2008

(65) Prior Publication Data

US 2009/0323222 A1    Dec. 31, 2009

(51) Int. Cl.
  *G11B 5/39* (2006.01)
(52) U.S. Cl.
  USPC ............... 360/324.12; 360/324.2; 360/128
(58) Field of Classification Search ............ 360/324.2, 360/128, 324, 324.12
  See application file for complete search history.

(56) References Cited

U.S. PATENT DOCUMENTS

| 5,065,483 | A  | * | 11/1991 | Zammit ............... 29/603.09 |
| 6,609,948 | B1 | * | 8/2003  | Fontana et al. ............ 451/5 |
| 6,807,034 | B2 | * | 10/2004 | Hasegawa et al. ...... 360/324.2 |
| 6,927,952 | B2 | * | 8/2005  | Shimizu et al. ....... 360/324.12 |
| 6,982,042 | B2 | * | 1/2006  | Church et al. ............. 216/22 |
| 7,035,062 | B1 |   | 4/2006  | Mao et al. |
| 7,177,122 | B2 |   | 2/2007  | Hou et al. |
| 7,715,154 | B2 | * | 5/2010  | Covington et al. ..... 360/324.12 |
| 2004/0257717 | A1 | * | 12/2004 | Sharma et al. .......... 360/324.2 |
| 2006/0064866 | A1 | * | 3/2006  | Cyrille et al. .......... 29/603.15 |

FOREIGN PATENT DOCUMENTS

| JP | A-2004-047079 | 2/2004 |
| JP | A-2005-294610 | 10/2005 |
| JP | A-2006-054044 | 2/2006 |
| JP | A-2006-073088 | 3/2006 |

OTHER PUBLICATIONS

Lamberton et al., *Current-in-Plane GMR Trilayer Head Design for Hard-Disk Drives: Characterization and Extendibility*, IEEE Transactions on Magnetics, vol. 43, No. 2, pp. 645-650, Feb. 2007.

\* cited by examiner

*Primary Examiner* — Julie Anne Watko
(74) *Attorney, Agent, or Firm* — Oliff & Berridge, PLC

(57) ABSTRACT

A thin film magnetic head includes a magnetoresistive element having a recording-medium-facing-surface which is to be faced with a magnetic recording medium; a magnetic bias layer located on a side opposite to the recording-medium-facing-surface of the magnetoresistive element, and applying a bias magnetic field to the magnetoresistive element in a direction orthogonal to the recording-medium-facing-surface; and a resistive film pattern having the recording-medium-facing-surface, the resistive film pattern being located side by side with the magnetoresistive element in a track-width direction.

16 Claims, 23 Drawing Sheets

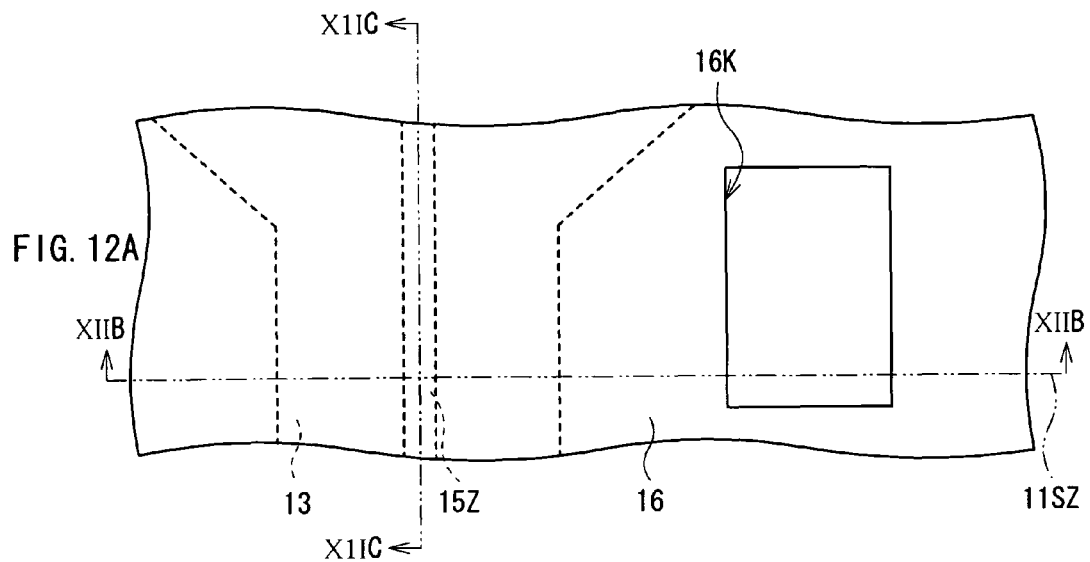
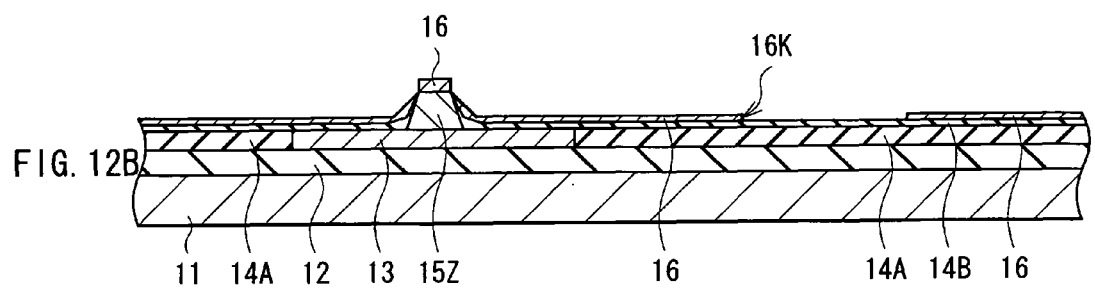
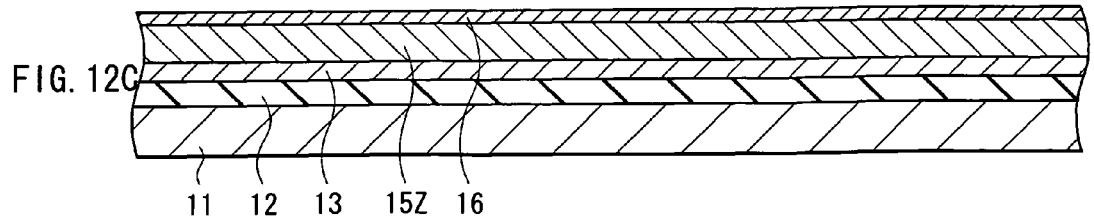

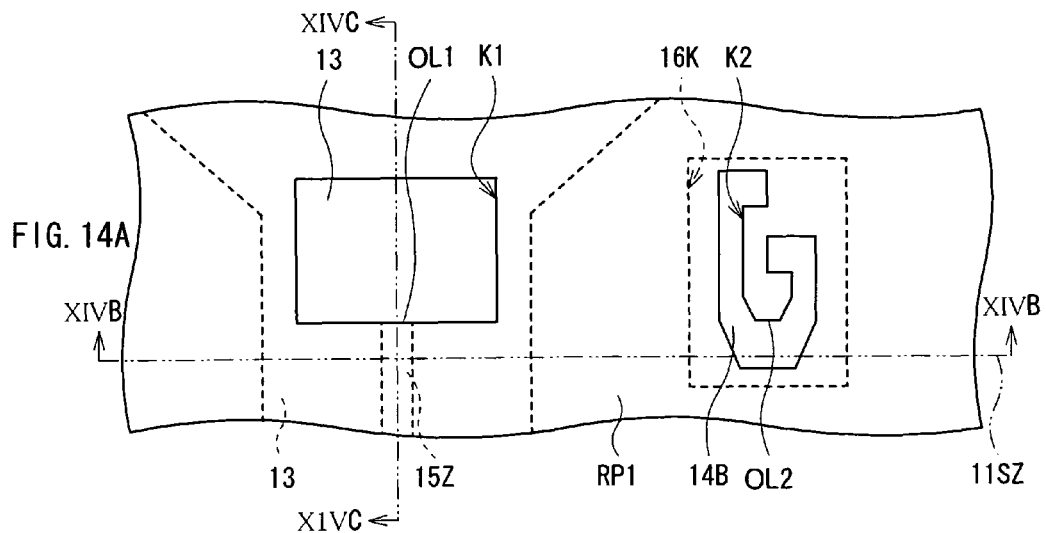
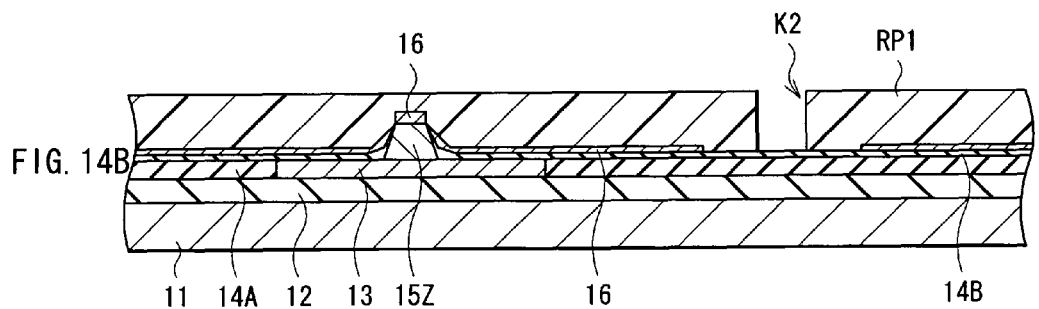
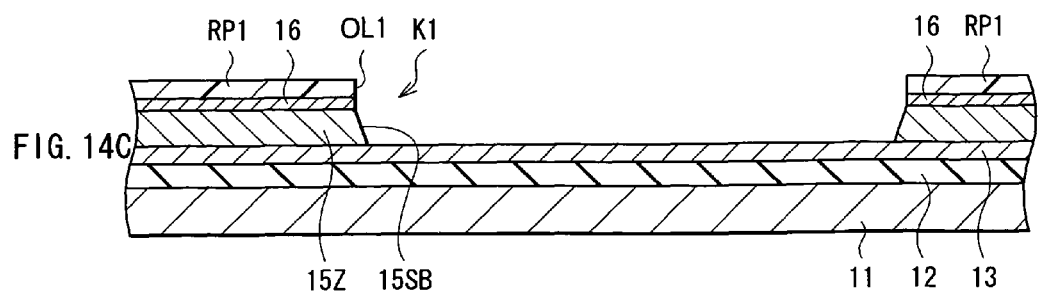

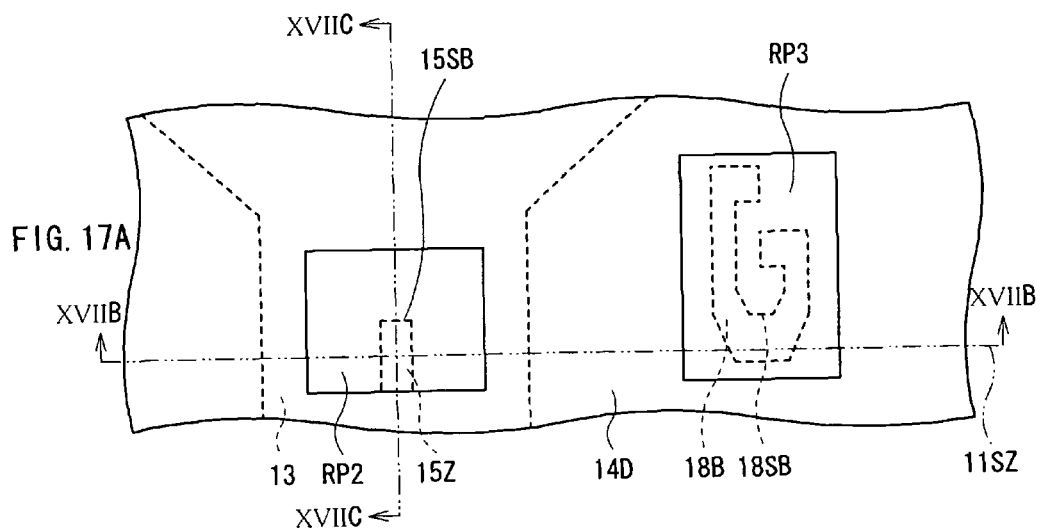
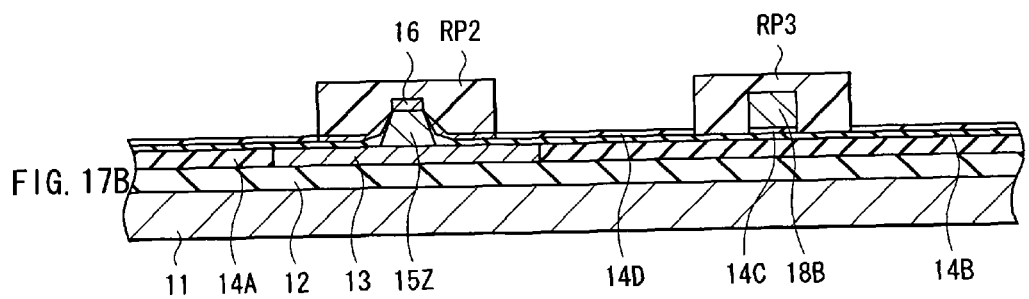
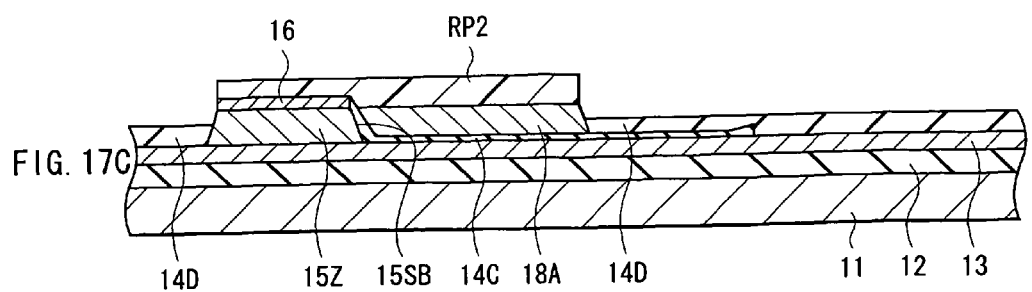

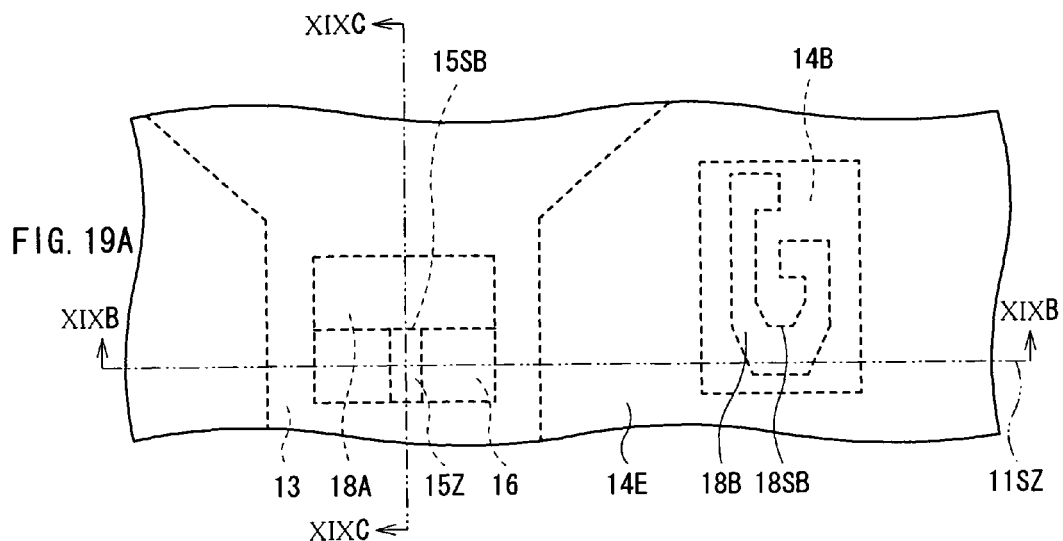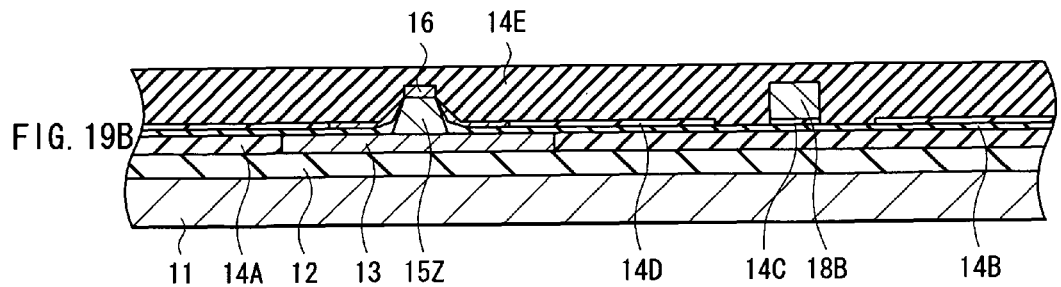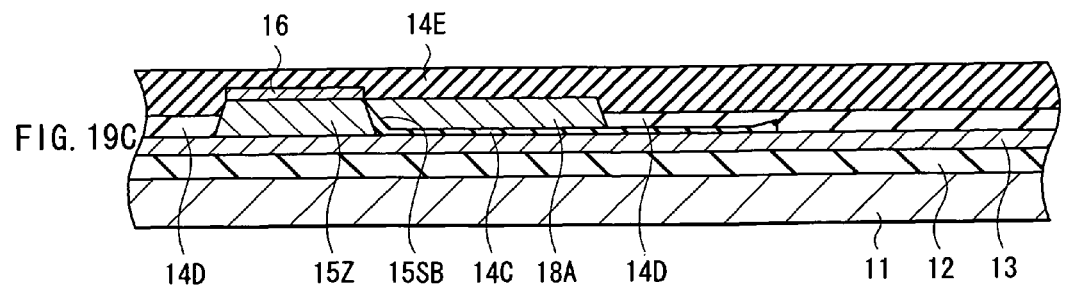

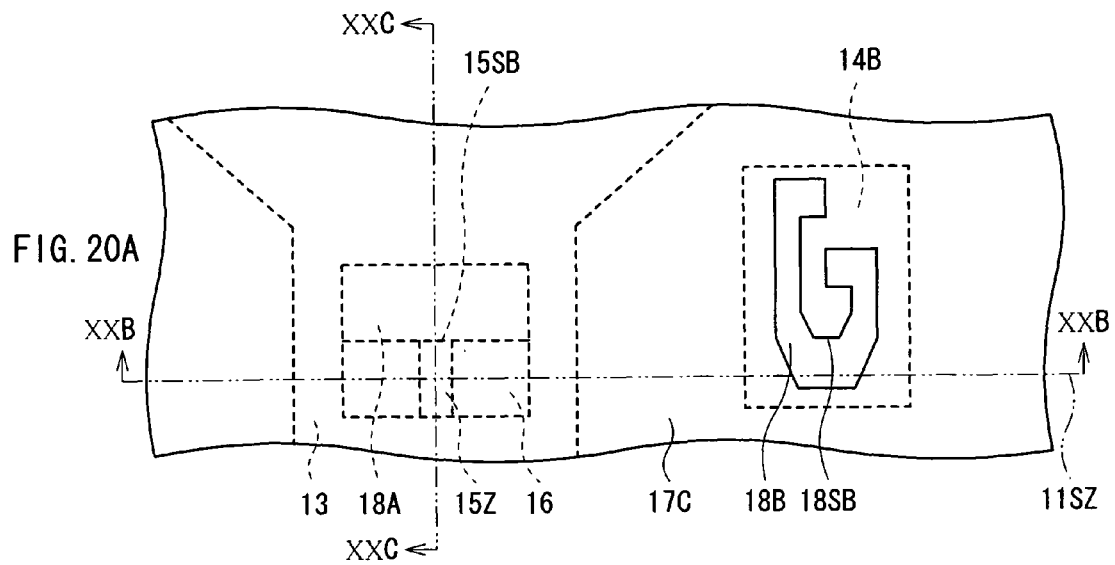
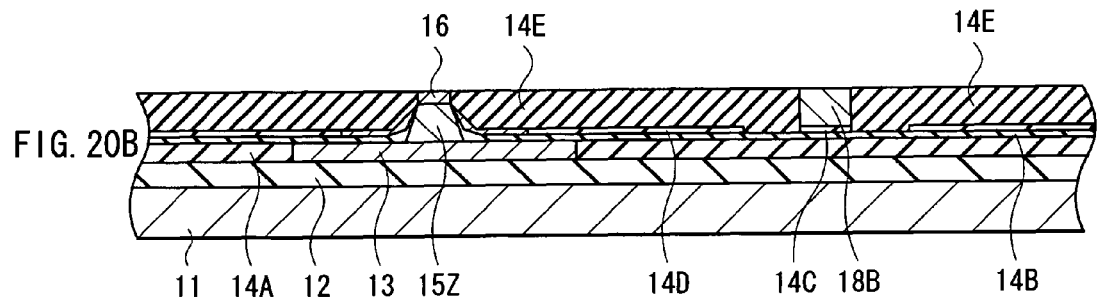
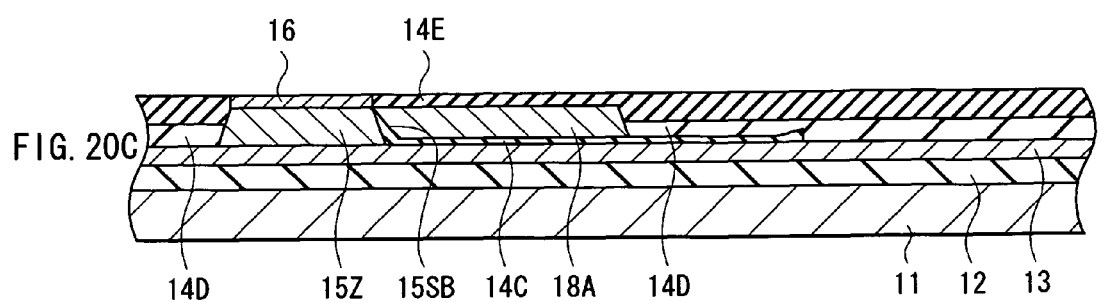

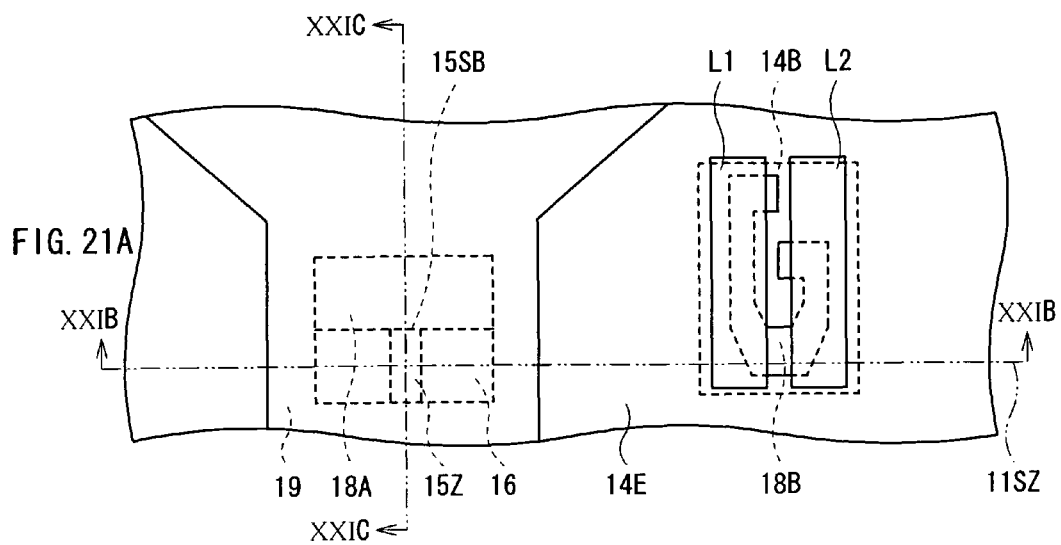
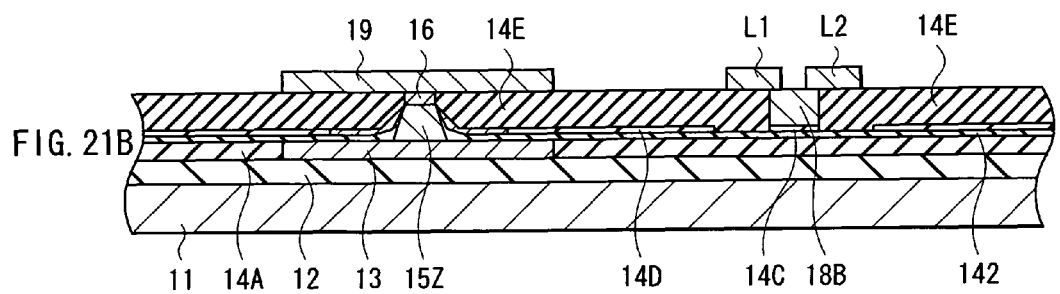
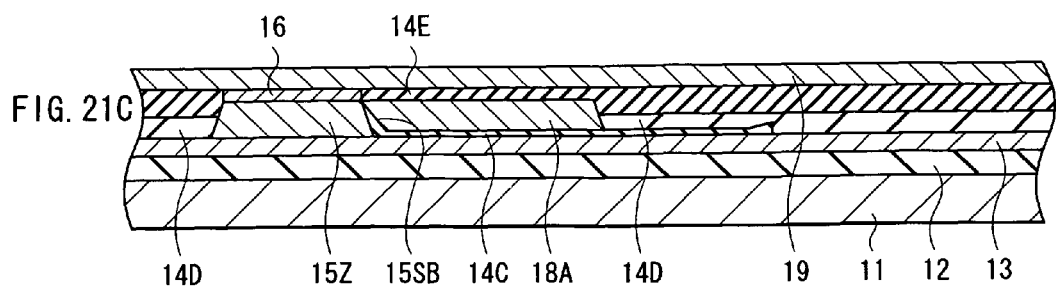

THIN FILM MAGNETIC HEAD HAVING SIMILARLY STRUCTURED RESISTIVE FILM PATTERN AND MAGNETIC BIAS LAYER

BACKGROUND OF THE INVENTION

1. Field of the Invention

The present invention relates to a thin film magnetic head including a magnetoresistive element and a method of manufacturing the same, and also relates to a magnetic head slider, head gimbal assembly, head arm assembly and magnetic disk device including the thin film magnetic head.

2. Description of the Related Art

A thin film magnetic head, which includes a magnetoresistive element (MR element) exhibiting the magnetoresistive effect (MR effect), is widely used for reading data written on magnetic recording media such as a hard disk. Recently, a thin film magnetic head which includes a giant magnetoresistive element (GMR element) exhibiting the giant magnetoresistive (GMR) effect is generally used because of highly-progressed recording density of the magnetic recording medium. Examples of such GMR element include a spin valve GMR element (SV-GMR element).

This SV-GMR element is configured in such a manner that a magnetic layer in which its magnetization direction is fixed in a given direction (magnetically pinned layer) and a magnetic layer in which its magnetization direction is varied in accordance with an external signal magnetic field applied from outside (magnetically free layer) are stacked via a nonmagnetic interlayer. In particular, those configured to make a read current pass in a direction along a stacking plane of the element during a reading operation is called CIP-GMR element (Current in Plane GMR element). Further, a thin film magnetic head including the CIP-GMR element is called CIP-GMR head. In this case, electric resistance (namely, voltage) is varied when the read current is applied in accordance with a relative angle between the magnetization directions of the two magnetic layers (the magnetically pinned layer and the magnetically free layer).

Recently, in response to the further improvement in the recording density, development of a CPP (Current Perpendicular to the Plane)-GMR head, which includes a CPP-GMR element in which the read current flows during the reading operation in a direction orthogonal to the staking plane, has been advanced (for example, refer to Japanese Unexamined Patent Application Publication No. 2002-329905). Such CPP-GMR head generally includes a GMR element, a pair of magnetic domain controlling layers that are arranged to face each other in a track-width direction with the GMR element in between via an insulating layer, and a lower electrode and an upper electrode that are arranged to face each other with the GMR element and the pair of magnetic domain controlling layers in between in the stacking direction. The upper and lower electrodes also serve as upper and bottom shielding layers. Such CPP-GMR head recognizes advantages in that high power is available when reducing the dimension in a read track width direction compared with the CIP-GMR head. Namely, in the CIP-GMR head, since the read current flows along the in-plane direction, the dimensional reduction in the read track width direction results in the narrowing of magnetic sensitive area through which the read current passes, thereby decreasing the amount of voltage changes. On the other hand, since the read current passes in the stacking direction in the CPP-GMR head, the dimensional reduction in the read track width direction does not affect the amount of voltage changes. For this reason, the CPP-GMR head is advantageous compared with the CIP-GMR head in terms of track density, which is expressed with TPI (number of tracks per inch). What is more, since insulating layers are omitted between the CPP-GMR element and upper/lower shielding films, that allows the reduction, by the thickness of the omitted layers, of the linear recording density, which is expressed with BPI (Bit Per Inch), as compared with the CIP-GMR head.

There is also a tunnel MR element (TMR element) which is configured similar to the CPP-GMR element in that the read current flows in a direction orthogonal to the in-plane direction. This TMR element further includes an ultra-thin insulating layer called a tunnel barrier layer so as to obtain much higher resistance change ratio than that of the above-mentioned CPP-GMR element. For this reason, the thin film magnetic head including the TMR element (TMR head) is highly expected to respond to the further improvement in the recording density.

Recently, a magnetic head, which includes a CPP-MR element in which two magnetically free layers are stacked with a nonmagnetic interlayer in between, has been proposed, as shown in U.S. Pat. No. 7,035,062. In this CPP-MR element, the two magnetically free layers are subjected to exchange coupling by what is called RKKY interaction via the nonmagnetic interlayer. In this magnetic head, a hard magnet layer is arranged at the rear of the CPP-MR element (on a side opposite to an air bearing surface) so that a bias magnetic field may be applied in the direction orthogonal to the air bearing surface. Because of this bias magnetic field applied, magnetization directions of the two magnetically free layers are relatively fixed to each other at a certain relative angle. If a signal magnetic field (external magnetic field) is given from a magnetic recording medium under this condition, the relative angle of the two magnetically free layers is changed and there appears a change in the electric resistance of sensing current. Such CPP-MR element needs no pinned layer or pinning layer because of its configuration. Accordingly, it is easily thin-shaped, and what is more, the read gap thereof may be narrowed so as to improve the read resolution.

By the way, in any of the above-mentioned various types of MR elements, the height or the dimensions from the front (edge portion exposed to an air bearing surface) to the back (edge portion on a side opposite to the air bearing surface) of the MR element is an important factor affecting the reading performance of a thin film magnetic head. Such height in the MR element is called MR height. To reduce errors in manufacturing the MR height, various techniques have been proposed with regard to the method of manufacturing the MR elements. For example, Japanese Patent Publication No. 2005-294610 discloses a method in which a resistance element (wrapping guide) is disposed side by side with an MR film at a given position, variation of the resistance of the resistance element is observed while polishing both of the MR film and the resistance element simultaneously and stop polishing when the resistance becomes a fixed value. In particular, here, since a photoresist pattern for determining the previous dimensions of the MR element and the resistance element before the polishing operation is formed in a lump-sum formation, more accurate MR height is available.

SUMMARY OF THE INVENTION

However, in the above-mentioned disclosure by Japanese Patent Publication No. 2005-294610, since the resistance element and the MR film are formed together with the same layer structure, the resistance of the resistance element is unstable and lacks reliability. Accordingly, a thin film magnetic head, which includes a magnetoresistive element processed more precisely using a resistance element exhibiting more stable resistance, is desired.

In view of the drawbacks of the inventions, it is desirable to provide a thin film magnetic head, a magnetic head slider, a head gimbal assembly, a head arm assembly and a magnetic disk device that are provided with a magnetoresistive element having better reading performance.

It is also desirable to provide a method of manufacturing a thin film magnetic head in which a thin film magnetic head, which is provided with a magnetoresistive element having better reading performance, may be formed more simply.

A thin film magnetic head of an embodiment of the present invention is configured to include the following three elements (A1) to (A3) on a substrate:

(A1): a magnetoresistive element having a recording-medium-facing-surface which is to be faced with a magnetic recording medium;

(A2): a magnetic bias layer located on a side opposite to the recording-medium-facing-surface of the magnetoresistive element, and applying a bias magnetic field to the magnetoresistive element in a direction orthogonal to the recording-medium-facing-surface; and (A3): a resistive film pattern having the recording-medium-facing-surface, the resistive film pattern being located side by side with the magnetoresistive element in a track-width direction and having the same configuration as the magnetic bias layer.

Here, "configured similar to" means that both of the magnetic bias layer and the resistive film pattern are made of a common component material in case of a single layer structure. In case of a multilayer structure, it means that at least some of the component materials are common to each other. Further, it is to be noted that a magnetic head slider, a head gimbal assembly, a head arm assembly, and a magnetic disk device according to an embodiment of the present invention are all configured to include the above-mentioned thin film magnetic head of the present invention.

In the thin film magnetic head of an embodiment of the present invention, since the given resistive film pattern is disposed on the substrate together with the magnetoresistive element when manufacturing, it becomes easy to obtain a highly-precise height dimension of the magnetoresistive element, i.e., the dimension in a direction orthogonal to the recording-medium-facing-surface, based on the resistance change of the resistive film pattern, which is caused in accordance with the polishing state. In addition, since the resistive film pattern is configured similar to the magnetic bias layer disposed in the rear of the magnetoresistive element, manufacturing simplicity is improved.

Namely, in the thin film magnetic head, the magnetic head slider, head gimbal assembly, a head arm assembly and the magnetic disk device including the thin film magnetic head of an embodiment of the present invention, the resistive film pattern which is electrically insulated from the magnetoresistive element and including the recording-medium-facing-surface is disposed on the substrate.

As a result, highly-precise processing is available at the time of manufacturing, thereby the magnetoresistive element may be dimensioned precisely in a direction orthogonal to the recording-medium-facing-surface. Accordingly, it becomes possible to exhibit higher reading performance.

A method of manufacturing a thin film magnetic head of an embodiment of the present invention includes the following six steps (B1) to (B6):

(B1): forming a magnetoresistive film selectively on a substrate;

(B2): forming a cover layer so as to cover at least the magnetoresistive film;

(B3): completing a mask pattern by collectively forming a first opening and a second opening in the cover layer, the first opening including a first edge extending across the magnetoresistive film in a track-width direction, the second opening including a second edge and being located side by side with the first opening in the track-width direction, the second edge extending in the track-width direction and being located at a given interval, as measured in a direction orthogonal to the track-width direction, from the first edge;

(B4): a step of determining a reference position of the magnetoresistive film corresponding to the first edge by removing, with use of the mask pattern, an area of the magnetoresistive film defined by the first opening;

(B5): forming, into the area defined by the first opening, an insulating layer followed by a magnetic bias layer after determining the reference position of the magnetoresistive film, and forming, into an area defined by the second opening, a resistive film pattern having a reference position corresponding to the second edge; and (B6): forming a magnetoresistive element having a recording-medium-facing-surface by polishing the stacked end surface of the magnetoresistive film together with that of the resistive film pattern toward the reference positions of the magnetoresistive film and the resistive film pattern so that the polishing operation may be stopped based on the resistance of the resistive film pattern, which varies in accordance with the polishing amount.

In the method of manufacturing the thin film magnetic head of an embodiment of the present invention, the mask pattern having the first and second openings are formed after selectively forming the magnetoresistive film and before forming the resistive film pattern. As a result, relative location of the reference position of the magnetoresistive film which is defined by the first edge in the first opening and the reference position of the resistive film pattern which is defined by the second edge in the second opening may be determined with high precision. Further, the stacked end surfaces of the magnetoresistive film and the resistive film pattern are collectively polished so that the polishing operation may be stopped based on the resistance of the resistive film pattern, which is varied in accordance with the polishing amount. In this manner, it becomes possible to form the magnetoresistive element having highly-precise height dimensions. In addition, since the photoresist pattern is used as a mask to form the magnetic bias layer and the resistive film pattern collectively, simplification of the production process is available. When the magnetic bias layer and the resistive film pattern are formed collectively, they may be configured similar to each other. For this reason, the variation in the resistance of the resistive film pattern at the time of polishing is stabilized compared with a case of related arts where the resistive film pattern is configured similar to the magnetoresistive element. Meanwhile, when forming the magnetic bias layer and the resistive film pattern in separate steps, component material of the resistive film pattern is not limited to that of the magnetic bias layer. Namely, the resistive film pattern may be formed with a material which is more suitable for monitoring of the resistance at the time of polishing operation. That further enhances an expectation for highly-precise height dimension of the magnetoresistive element.

In the thin film magnetic head and the method of manufacturing the same of an embodiment of the present invention, it is preferred that the magnetoresistive element has a stacked structure typically including a first non-magnetic layer and a first and a second ferromagnetic layers opposed to each other in their thickness direction with the first non-magnetic layer in between, and magnetization directions of the first and second ferromagnetic layers vary in response to application of external magnetic field, and stay antiparallel to each other in the absence of a magnetic field. In this manner, the first non-magnetic layer may contain one or more selected from the group consisting of copper (Cu), Silver (Ag), Gold (Au), Zinc (Zn), Ruthenium (Ru), Rhodium (Rh), and compounds thereof. The thin film magnetic head may further include a third ferromagnetic layer which is disposed on the opposite side of the second ferromagnetic layer from the first ferromagnetic layer and a second non-magnetic layer which is disposed between the second ferromagnetic layer and the third ferromagnetic layer. In this case, it is preferred that the second non-magnetic layer is a tunnel barrier layer containing one or more selected from the group consisting of magnesium oxide (MgO), aluminum oxide (AlOx), zinc oxide (ZnO), titanium oxide (TiOx), and aluminum nitride (AlN). In particular, when each of the magnetic bias layer and the resistive film pattern includes a ferromagnetic material layer containing cobalt, and each of the first to third ferromagnetic layers includes a ferromagnetic material containing cobalt, the precision of the polishing process may improve and highly-precise height dimension of the MR element is available in manufacturing.

In the thin film magnetic head and method of manufacturing the same according to an embodiment of the present invention, the resistive film pattern in film thickness direction is partially or fully overlapped with location of the magnetoresistive element in film thickness direction on a stacking plane. In this manner, the precision of the polishing process may further improve, thereby further improving the precision of the height dimension of the MR element. Alternatively, when two or more of the resistive film patterns are provided on both sides of the magnetoresistive element in the track-width direction, the precision of the polishing process improve further, thereby further improving the precision of the height dimension of the MR element.

Other objects, features and effects of the present invention will be explained as necessary in the following descriptions.

BRIEF DESCRIPTION OF THE DRAWINGS

FIG. 12A is a principal portion plan view of a step subsequent to FIG. 11A.

FIG. 12B is a first principal portion sectional view corresponding to the principal portion plan view of FIG. 12A.

FIG. 12C is a second principal portion sectional view corresponding to the principal portion plan view of FIG. 12A.

FIG. 14A is a principal portion plan view of a step subsequent to FIG. 13A.

FIG. 14B is a first principal portion sectional view corresponding to the principal portion plan view of FIG. 14A.

FIG. 14C is a second principal portion sectional view corresponding to the principal portion plan view of FIG. 14A.

FIG. 17A is a principal portion plan view of a step subsequent to FIG. 16A.

FIG. 17B is a first principal portion sectional view corresponding to the principal portion plan view of FIG. 17A.

FIG. 17C is a second principal portion sectional view corresponding to the principal portion plan view of FIG. 17A.

FIG. 19A is a principal portion plan view of a step subsequent to FIG. 18A.

FIG. 19B is a first principal portion sectional view corresponding to the principal portion plan view of FIG. 19A.

FIG. 19C is a second principal portion sectional view corresponding to the principal portion plan view of FIG. 19A.

FIG. 20A is a principal portion plan view of a step subsequent to FIG. 19A.

FIG. 20B is a first principal portion sectional view corresponding to the principal portion plan view of FIG. 20A.

FIG. 20C is a second principal portion sectional view corresponding to the principal portion plan view of FIG. 20A.

FIG. 21A is a principal portion plan view of a step subsequent to FIG. 20A.

FIG. 21B is a first principal portion sectional view corresponding to the principal portion plan view of FIG. 21A.

FIG. 21C is a second principal portion sectional view corresponding to the principal portion plan view of FIG. 21A.

DETAILED DESCRIPTION OF THE PREFERRED EMBODIMENTS

Embodiments of the present invention will be described in detail hereinbelow with reference to the drawings.

First, configuration and operation of a thin film magnetic head according to an embodiment of the present invention and a magnetic head slider, head gimbal assembly, head arm assembly and magnetic disk device including the thin film magnetic head will be described hereinbelow with reference to FIGS. 1 to 7.

Figure 1:
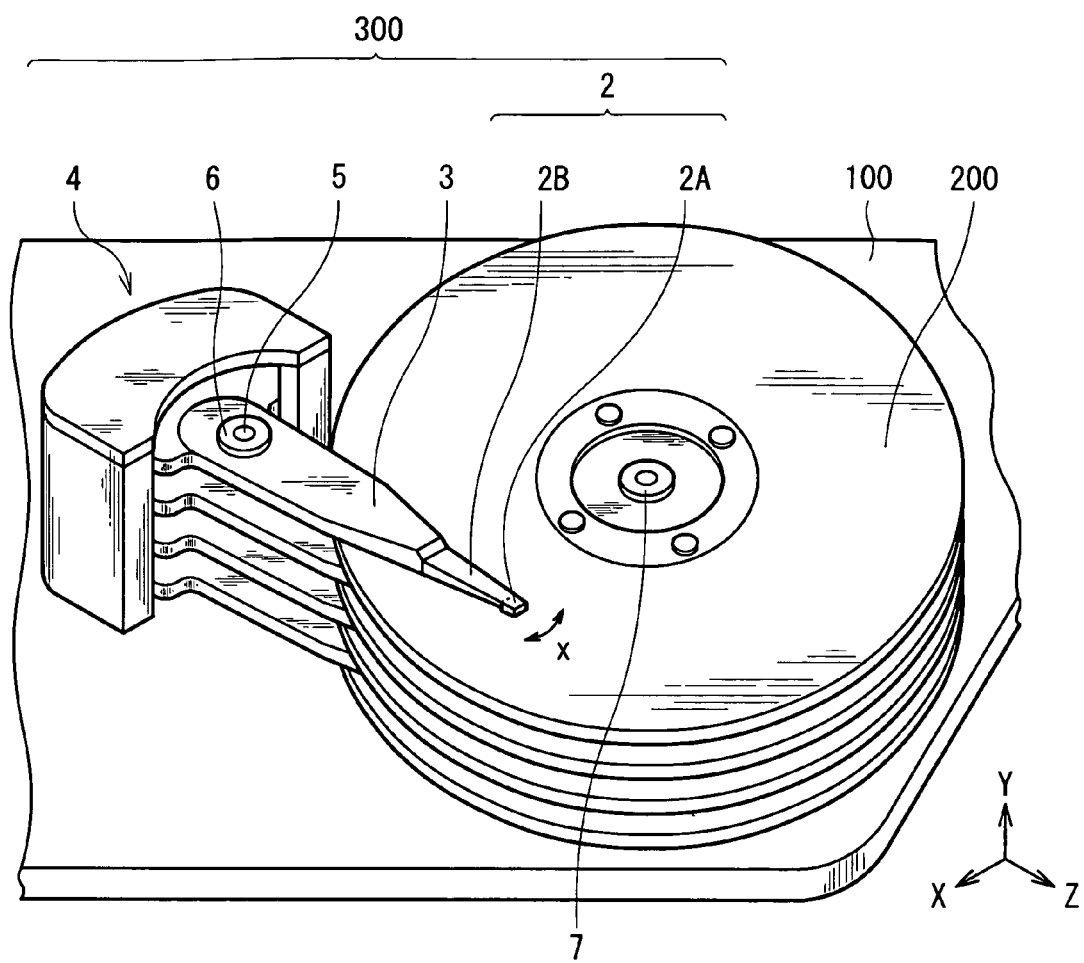
FIG. 1 is a perspective view showing a configuration of an actuator arm that includes a thin film magnetic head according to an embodiment of the present invention.

FIG. 1 is a perspective view showing an internal configuration of the magnetic disk device according to the present embodiment. The magnetic disk device includes, inside a housing 100, a magnetic recording medium 200 that works as a magnetic recording medium on which data is written, and a head arm assembly (HAA) 300 which writes data onto the magnetic recording medium 200 and reads it as shown in FIG. 1. The HAA 300 includes a head gimbal assembly (HGA) 2, an arm 3 supporting the base portion of the HGA 2, and an actuator 4 that works as the power source for rotating the arm 3. The HGA 2 includes a magnetic head slider 2A (hereinafter referred to as "slider") having an after-mentioned thin film magnetic head 1 of the present embodiment on one side-face thereof, and a suspension 2B having the slider 2A attached to one end thereof. The other end (the end portion on a side opposite to the slider 2A) of the suspension 2B is supported by the arm 3. The arm 3 is configured to rotate with respect to a fixed axle 5 which is fixed to the housing 100 via a bearing 6. The actuator 4 is typically constituted from a voice coil motor. Usually, the magnetic disk device includes a plurality of magnetic recording media 200 and a plurality of the sliders 2A are arranged corresponding to writing surfaces (upper surface and rear surface) of the respective magnetic recording media 200 as shown in FIG. 1. Each of the sliders 2A is movable in a direction across the read track (the X-axial direction) on a plane parallel to the writing surface of the respective magnetic recording media 200. Meanwhile, the magnetic recording medium 200 rotates around a spindle motor 7 which is fixed to the housing 100 in a direction approximately orthogonal to the X-axial direction. Thus data is written on the magnetic recording medium 200 and read out by rotation of the magnetic recording medium 200 and transverse motion of the slider 2A.

Figure 2:
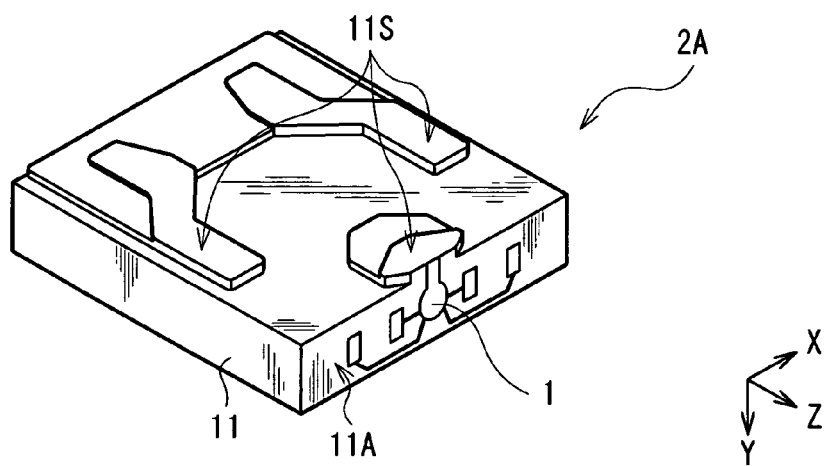
FIG. 2 is a perspective view showing a configuration of a slider in the actuator arm appearing in FIG. 1.

FIG. 2 shows a configuration of the slider 2A appearing in FIG. 1. This slider 2A includes a block-shaped substrate 11 typically made of Altic ($A_2O_3$□TiC). The substrate 11 is approximately hexahedral in shape, for example, and is arranged so that one side face thereof is approximately opposed to the writing surface of the magnetic recording medium 200. The side face opposed to the writing surface of the magnetic recording medium 200 is called recording-medium-facing-surface 11S, which is also called air bearing surface (ABS). When the magnetic recording medium 200 rotates, the slider 2A floats from the writing surface in the direction of Y by lift arising from the airflow between the writing surface and the recording-medium-facing-surface 11S so that a specified gap is kept between the recording-medium-facing-surface 11S and the magnetic recording medium 200. A thin film magnetic head 1 is disposed on an element formation face 11A which is one of the side faces of the substrate 11 as with the recording-medium-facing-surface 11S.

Figure 3:
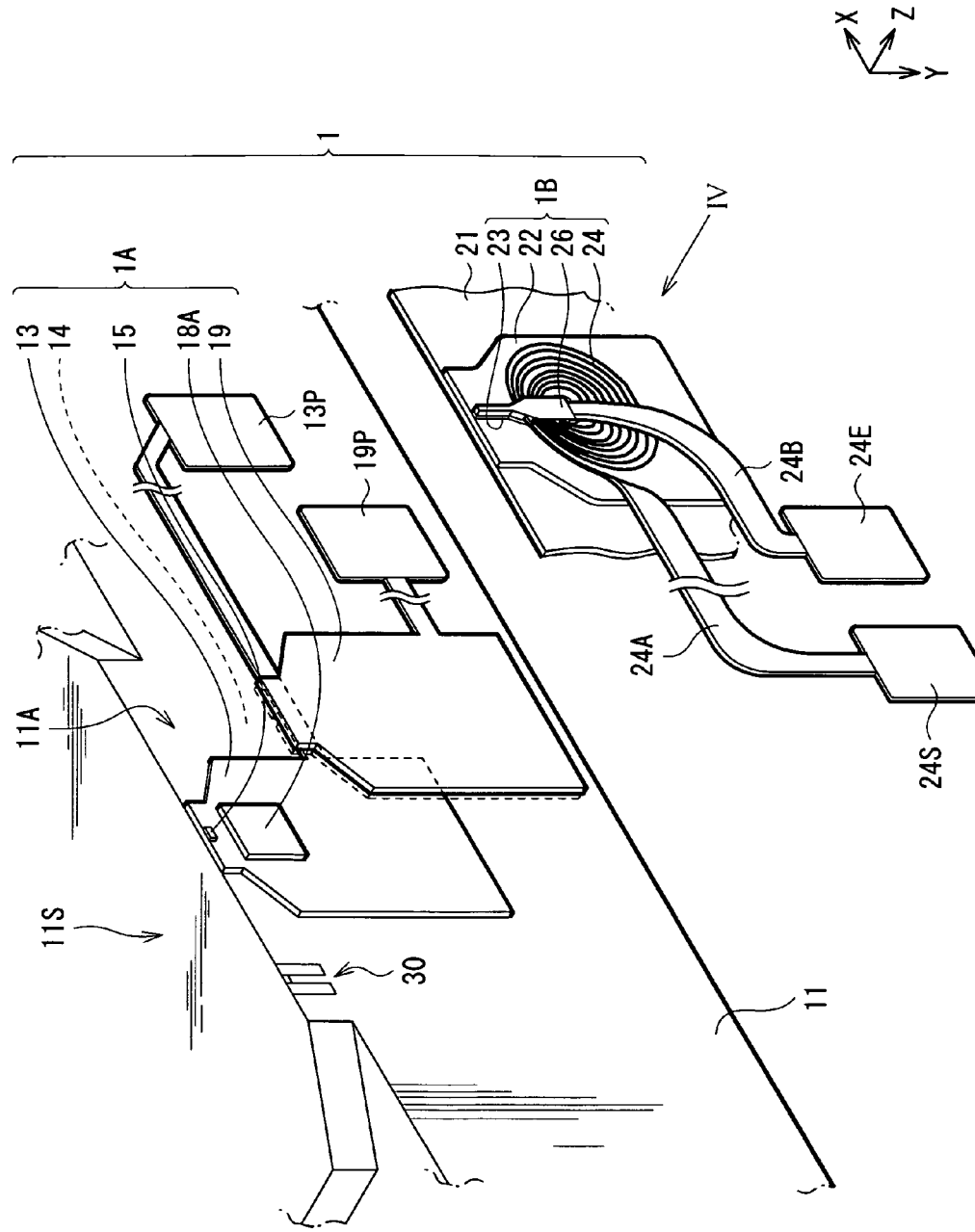
FIG. 3 is an exploded perspective view showing a configuration of the thin film magnetic head appearing in FIG. 1.
Figure 4:
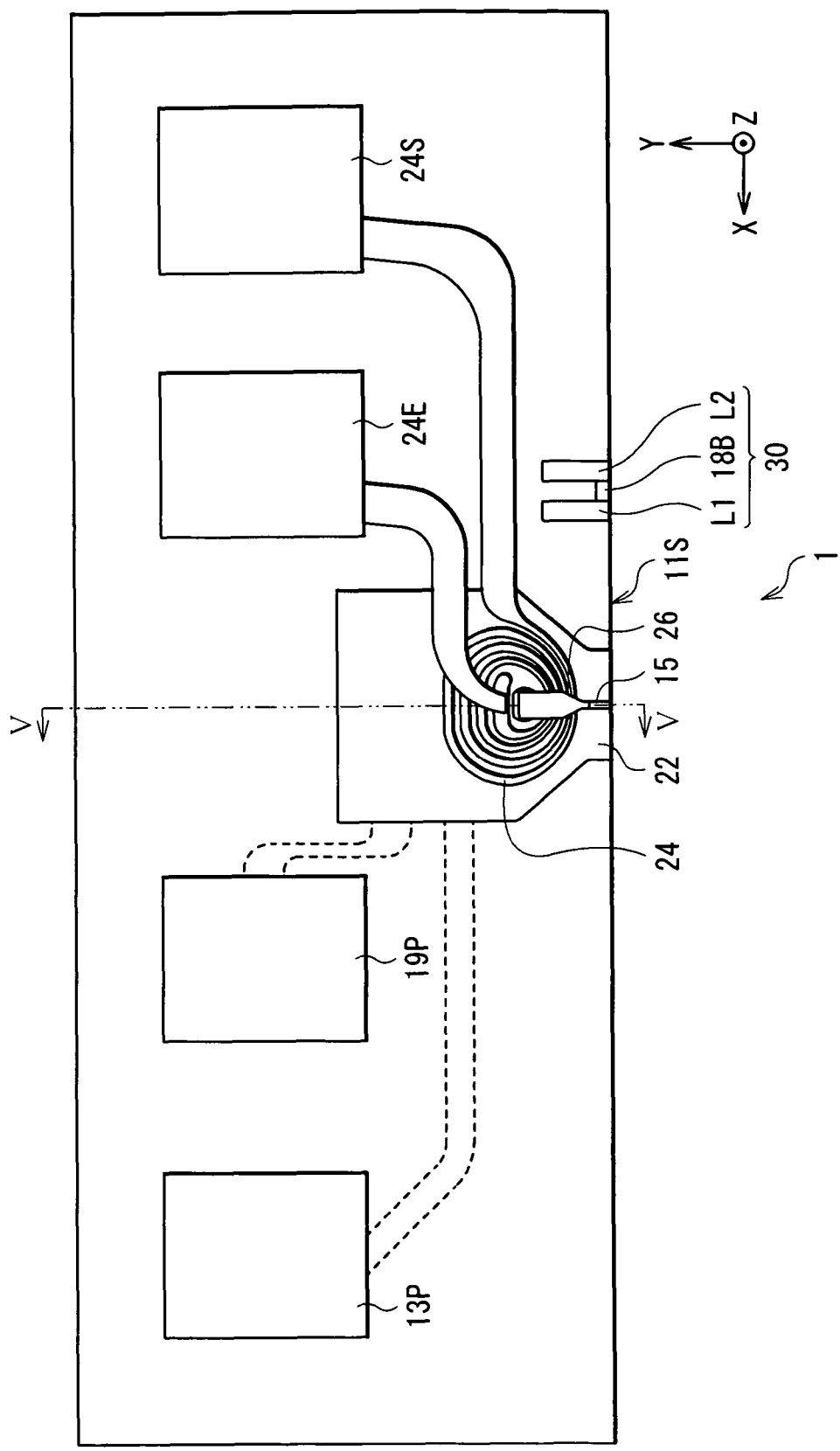
FIG. 4 is a plan view showing a principal portion of the thin film magnetic head, as viewed from the direction indicated by arrow IV as shown in FIG. 3.
Figure 5:
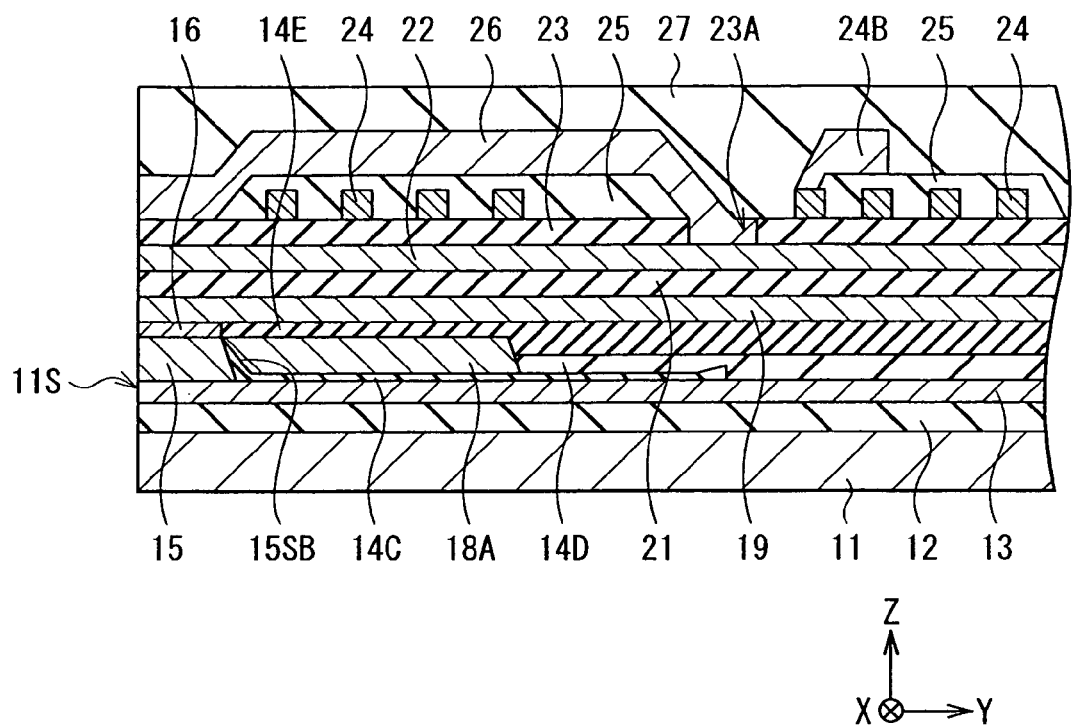
FIG. 5 is a sectional view showing a configuration of the thin film magnetic head appearing in FIG. 4, taken along the line V-V, as viewed from the direction indicated by arrows.

FIG. 3 is an exploded perspective view disassembling and showing the configuration of the thin film magnetic head 1. FIG. 4 is a plan view of the thin film magnetic head, as viewed from the direction indicated by arrow IV as shown in FIG. 3. FIG. 5 is a sectional view showing a configuration of the thin film magnetic head appearing in FIG. 4, taken along the line V-V, as viewed from the direction indicated by arrows. As shown in FIGS. 3 to 5, the thin film magnetic head 1 is integrally constituted from a read head portion 1A which reads magnetic information written on the magnetic recording medium 200 and a write head portion 1B which writes magnetic information on a write track of the magnetic recording medium 200.

Figure 6:
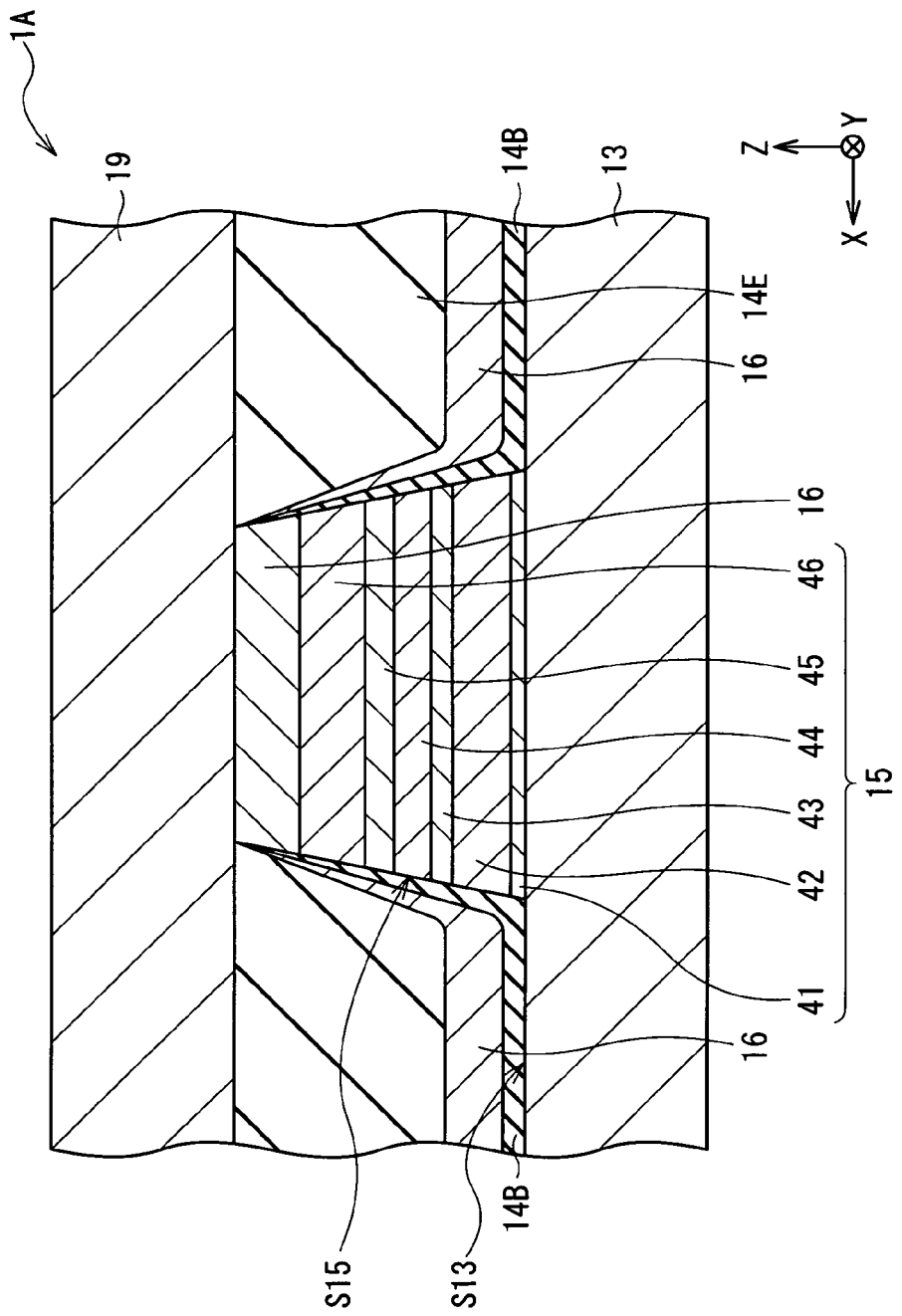
FIG. 6 is an enlarged cross section showing a principal portion of an MR element appearing in FIG. 3.
Figure 7:
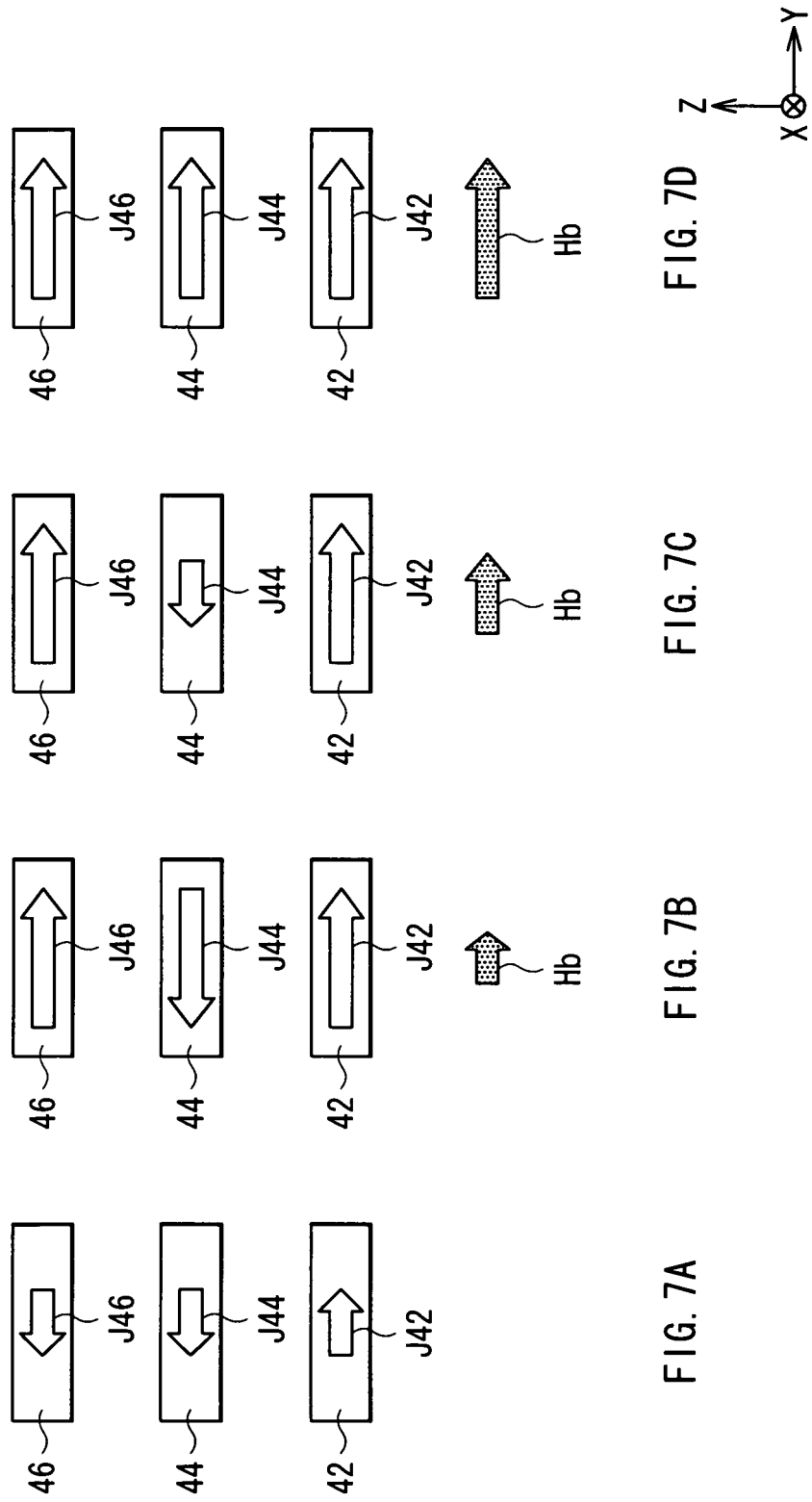
FIG. 7A is a first conceptual diagram for explaining the magnetization state of the MR element shown in FIG. 6.
FIG. 7B is a second conceptual diagram for explaining the magnetization state of the MR element shown in FIG. 6.
FIG. 7C is a third conceptual diagram for explaining the magnetization state of the MR element shown in FIG. 6.
FIG. 7D is a fourth conceptual diagram for explaining the magnetization state of the MR element shown in FIG. 6.

FIG. 6 is a sectional view showing a principal portion of the read head portion 1A on the recording-medium-facing-surface 11S. As shown in FIGS. 3, 5 and 6, the read head portion 1A includes a magnetoresistive element (hereinafter referred to as MR element) 15 having the CPP (Current Perpendicular to the Plane) structure, in which sensing current flows in a stacking direction of MR layers. Specifically, a bottom shielding layer 13, the MR element 15, and an top shielding layer 19 are stacked in order via an insulating layer 12 on the substrate 11, for example. A cap layer 16 (which will be described later) is disposed between the MR element 15 and the top shielding layer 19. A magnetic bias layer 18A is disposed in a backward portion of the MR element 15, i.e., a portion opposite to the recording-medium-facing-surface 11S via an insulating layer 14C (refer to FIG. 5). It is to be noted that the MR element 15 is surrounded with an insulating layer 14 (14B; 14C, 14E). In particular, the insulating layer 14B continuously covers the whole portion from the upper surface S13 of the bottom shielding layer 13 to the end face S15 of the MR element 15 so that an electrical path for the sensing current may be specified correctly, and the sensing current may be prevented from leaking out of the MR element 15 (refer to FIG. 6).

The bottom shielding layer 13 and the top shielding layer 19 are typically formed to the thickness of 1 to 3 μm respectively, and made of a soft magnetism metal material such as nickel iron alloy (NiFe). These lower shield layer 13 and upper shield layer 19 are opposed to each other with the MR element 15 in between in the stacking direction (the direction of Z), so as to prevent the MR element 15 from being affected by unnecessary magnetic fields. The bottom shielding layer 13 is connected to a pad 13P and the top shielding layer 19 is connected to a pad 19P so that they also function as a current path for applying current to the MR element 15 in the stacking direction (the direction of Z).

The MR element 15, which is structured in such a manner that many metal membranes containing a magnetic material are stacked as shown in FIG. 6, functions as a sensor to read magnetic information written on the magnetic recording medium 200. Specifically, a foundation layer 41, a first ferromagnetic layer 42, a first non-magnetic layer 43, a second ferromagnetic layer 44, a second non-magnetic layer 45 and a third ferromagnetic layer 46 are stacked in order from the side of the bottom shielding layer 13.

The foundation layer (also referred to as buffer layer) 41 typically has a structure in which a tantalum (Ta) layer (1 to 3 nm in thickness) and a ruthenium (Ru) layer (1 to 3 nm in thickness) are stacked in order from the side of the bottom shielding layer 13.

The first to third ferromagnetic layers 42, 44 and 46 are all made of a soft ferromagnetic material, such as cobalt iron alloy (CoFe). Here, the second ferromagnetic layer 44 mainly has a characteristic as a free layer so that its magnetization direction is variable when exposed to a signal magnetic field from the magnetic recording medium 200. The first ferromagnetic layer 42 and the second ferromagnetic layer 44 are subjected to exchange coupling by RKKY interaction via the first non-magnetic layer 43, and their magnetization directions are inverse-parallel to each other in the absence of a magnetic field. The third ferromagnetic layer 46 is coupled to the second ferromagnetic layer 44 via the second non-magnetic layer 45 so that their magnetization directions are parallel to each other in the absence of a magnetic field. It is preferred that the magnetic film thickness of both of the first and the third ferromagnetic layers 42 and 46 are larger than that of the second ferromagnetic layer 44. Examples of the material constituting the first to third ferromagnetic layers 42, 44 and 46 includes not only CoFe but also CoFeB, NiFe, NiFeB, CoNiFe, CoNiFeB, FePt and CoPt.

The first non-magnetic layer 43 is formed to the thickness of 0.5 to 2.0 nm and made of a nonmagnetic conductive material, such as ruthenium, for example. The thickness and component material of the first non-magnetic layer 43 is not limited to that as far as it enables to cause an exchange coupling between the first ferromagnetic layer 42 and the second ferromagnetic layer 44 by RKKY interaction.

The second non-magnetic layer 45 is a tunnel barrier layer made of magnesium oxide or the like, for example, and formed to the thickness of 0.5 to 2.0 nm. The second non-magnetic layer 45 produces a tunnel magnetoresistive effect (TMR effect) between the second ferromagnetic layer 44 and the third ferromagnetic layer 46, thereby realizing a higher magnetoresistance change ratio (MR ratio). The second non-magnetic layer 45 as a tunnel barrier layer may be made of MgO, or aluminum oxide (AlOx), zinc oxide (ZnO), titanium oxide (TiOx) or aluminum nitride (AlN).

The cap layer 16 covering the uppermost surface of the MR element 15 has a structure in which a tantalum (Ta) layer (1 to 3 nm in thickness) and a ruthenium (Ru) layer (1 to 3 nm in thickness) are stacked in order from the side of the third ferromagnetic layer 46, for example. The cap layer 16 protects the completed MR element 15 in the manufacturing process, and there is no problem if it remains to cover the insulating layer 14B.

The magnetic bias layer 18A gives a bias magnetic field to the MR element 15 in a direction orthogonal to the recording-medium-facing-surface 11S. Its periphery is covered with the insulating layers 14 (14C to 14E, etc.) so that it is electrically insulated from both of the bottom shielding layer 13 and the top shielding layer 19. The magnetic bias layer 18A may be a single layer structure made of a ferromagnetic material containing cobalt, such as cobalt platinum alloy (CoPt) and cobalt chrome platinum alloy (CoCrPt), for example, or may be a multilayer structure including the layer made of such ferromagnetic materials. It functions to restrain the magnetization directions of the first ferromagnetic layer 42 and the third ferromagnetic layer 46 by the above-mentioned bias magnetic field.

Here, direction and strength of the bias magnetic field given by the magnetic bias layer 18A, and direction and strength of magnetizations in the first to third ferromagnetic layers 42, 44 and 46 will be described with reference to FIGS. 7A 7B, 7C and 7D. FIGS. 7A to 7D are conceptual diagram schematically showing the magnetization directions J42, J44 and J46 in the first to third ferromagnetic layers 42, 44 and 46 in cross sections (YZ cross section) orthogonal to the recording-medium-facing-surface 11S respectively. The length of arrows representing the magnetization directions J42, J44 and J46 shows strength of the respective magnetizations. The direction and length of arrows denoted by a reference symbol Hb shows a direction and strength of the respective bias magnetic fields.

FIG. 7A shows a state where no signal magnetic field is applied from the magnetic recording medium 200 and no bias magnetic field Hb is applied from the magnetic bias layer 18A (hereinafter called State A). In State A, the first ferromagnetic layer 42 and the second ferromagnetic layer 44 are subjected to exchange coupling by RKKY interaction, and the magnetization directions J42 and J44 are inverse-parallel to each other. Meanwhile, the magnetization directions J44 and J46 of the second ferromagnetic layer 44 and the third ferromagnetic layer 46 are parallel to each other by ferromagnetism interaction via the second non-magnetic layer 45. Namely, in State A, the magnetization direction J42 of the first ferromagnetic layer 42 becomes inverse-parallel to the magnetization direction J44 of the second ferromagnetic layer 44, while the magnetization direction J46 of the third ferromagnetic layer 46 becomes parallel to J44, thereby stabilization is available.

FIG. 7B shows a state where the bias magnetic field Hb is applied in the direction of +Y (hereinafter called State B). Here, the bias magnetic field Hb has the minimum possible magnitude to break the ferromagnetic exchange coupling between the second ferromagnetic layer 44 and the third ferromagnetic layer 46, that is, the magnitude slightly exceeding the exchange coupling magnetic field Hex between the second ferromagnetic layer 44 and the third ferromagnetic layer 46. Magnetic film thickness of the first ferromagnetic layer 42 is larger than that of the second ferromagnetic layer 44. Similarly, magnetic film thickness of the third ferromagnetic layer 46 is larger than that of the second ferromagnetic layer 44. In this State B, the magnetization direction J42 of the first ferromagnetic layer 42 and the magnetization direction J46 of the third ferromagnetic layer 46 are directed to the same direction as that of the bias magnetic field Hb (the direction of +Y). Meanwhile, the magnetization direction J44 of the second ferromagnetic layer 44 is directed to a direction opposite to the direction of the bias magnetic field Hb (the direction of −Y).

FIG. 7C shows a state where the magnitude of the bias magnetic field Hb in the direction of +Y is increased compared with State B (hereinafter called State C). Here, since the magnetization direction J44 of the second ferromagnetic layer 44 gradually starts rotation to the direction of +Y, the magnitude of the magnetization J44 in the direction of −Y becomes smaller as a whole. When further increasing the magnitude of the bias magnetic field Hb in the direction of +Y, the magnetization direction J44 of the second ferromagnetic layer 44 becomes thoroughly directed in parallel with the direction of the bias magnetic field Hb (the direction of +Y) as shown in FIG. 7D, namely, the magnetization directions J42, J44 and J46 in the first to third ferromagnetic layers 42, 44 and 46 are all parallel to one another (hereinafter called State D). The bias magnetic field Hb in State D is called saturation magnetic field Hs in particular.

In the read head portion 1A, the magnetic bias layer 18A applies the bias magnetic field Hb, which is of the order larger than the exchange coupling magnetic field Hex and smaller than the saturation magnetic field Hs, in the direction of +Y for example. Namely, when the signal magnetic field is not applied from the magnetic recording medium 200, magnetization directions J42, J44 and J46 are directed as with State C.

Next, reading operation of the read head portion 1A will be explained. The read head portion 1A is configured to read written information based on the fact that the electric resistance of the MR element 15 is variable in accordance with the state of signal magnetic field from the magnetic recording medium 200.

When the read head portion 1A reads written information, a sensing current is first applied to the MR element 15 via the bottom shielding layer 13 and the top shielding layer 19 in the stacking direction (the direction of Z). Namely, sensing current is applied inside the MR element 15 from the foundation layer 41, through the first ferromagnetic layer 42, the first non-magnetic layer 43, the second ferromagnetic layer 44, the second non-magnetic layer 45, and the third ferromagnetic layer 46 in this order or vice versa. Here, when signal magnetic field from the magnetic recording medium 200 is applied, the magnetization direction J44 of the second ferromagnetic layer 44 rotates in accordance with the direction and magnitude of the signal magnetic field. For example, when a signal magnetic field in the direction of +Y as with the bias magnetic field Hb is applied, the magnetization direction J44 rotates so as to be in parallel to the magnetization directions J42 and J46 of the first and third ferromagnetic layers 42 and 46, thereby the relative relation of the magnetization directions J42, J44 and J46 is approaching State D of FIG. 7D. On the other hand, when a signal magnetic field in the direction of −Y, which is opposite to that of the bias magnetic field Hb, is applied, the magnetization direction J44 rotates so as to be in inverse-parallel to the magnetization directions J42 and J46, thereby the relative relation of the magnetization directions J42, J44 and J46 is approaching State B of FIG. 7B. Such variation in magnetization states in accordance with the variation of signal magnetic field causes a change in the spin-dependent scattering of conduction electrons in a sensing current passing through the MR element 15 in its stacking direction, resulting a change of the resistance of the MR element 15. Specifically, resistance is higher in State B than in State D. Since such variation in resistance brings about variation in output voltage, it becomes possible to read the information written on the magnetic recording medium 200 by detecting this current variation.

Next, configuration of the write head portion 1B will be described. As shown in FIGS. 3 and 5, the write head portion 1B is formed via an insulating layer 21 on the read head portion 1A, and includes a lower magnetic pole 22, a write gap layer 23, a coil 24, an insulating layer 25 and an upper magnetic pole 26.

The lower magnetic pole 22 is typically made of a magnetic material such as NiFe, and is formed on the insulating layer 21. The write gap layer 23 is made of an electrical insulating material such as A$_2$O$_3$, and is formed on the lower magnetic pole 22. The write gap layer 23 has an opening 23A in a portion opposed to the center, as viewed on the X-Y plane, of the coil 24 to form a magnetic path. The coil 24 is windingly disposed on the write gap layer 23 with the center of the winding aligned to the center of the opening 23A, and is typically made of copper (Cu) or gold (Au). Most of the coil 24, except its end portions, is covered with the insulating layer 25, which is made of photoresist or the like. Both ends of the coil 24 are connected to electrodes 24S and 24E via coil leads 24A and 24B, respectively. Further, the upper magnetic pole 26 is formed to cover the write gap layer 23, the opening 23A and the insulating layer 25. The upper magnetic pole 26 is made of a soft magnetic material having a high saturation magnetic flux density, such as NiFe for example, and is in contact with the lower magnetic pole 22 via the opening 23A so as to be magnetically connected each other. Further, a protective film 27, which is made of an electrical insulating material such as Al$_2$O$_3$, covers the whole upper surface of the write head portion 1B.

With such configuration of the write head portion 1B, magnetic flux is generated in the magnetic path mainly constituted from the lower magnetic pole 22 and the upper magnetic pole 26 when the write current is applied in the coil 24. With such magnetic flux, a signal magnetic field is generated around the write gap layer 23, thereby magnetizing a specified region of the magnetic recording medium 200 to write data thereon.

The thin film magnetic head 1 further includes an RLG (Resistance Lapping Guide) element 30 having a resistive film pattern 18B, one end of which is exposed to the recording-medium-facing-surface 11S. The resistive film pattern 18B is disposed side by side with the MR element 15, as viewed in the track-width direction, on the element formation face 11A of the substrate 11 via an insulating layer so that it may be aligned in its width direction (the Z-axial direction) with at least a part of the magnetoresistive element on a stacking plane. Further, the resistive film pattern 18B is configured similar to the magnetic bias layer 18A, and both ends thereof, in the direction along the recording-medium-facing-surface 11S, are electrically connected to the pair of leads L1 and L2 respectively. Here, "configured similar to" means that both of the magnetic bias layer 18A and the resistive film pattern 18B are made of a common component material in case of a single layer structure. In case of a multilayer structure, it means that at least some of the component materials are common to each other. However, as for the multilayer structure, it is desirable that component materials of the respective structure layers are all common to each other and they are stacked in the same stacking sequence. By the way, whether it is single or multi, the thickness thereof may be different from that of the magnetic bias layer 18A. In addition, one of the pair of leads L1 and L2 may be connected to an earth terminal (typically connected to the substrate 11). When the recording-medium-facing-surface 11S is formed by polishing process in the manufacturing process as mentioned later, the RLG element 30 functions to control the progress of the polishing process based on the resistance variation in the resistive film pattern 18B. Namely, the RLG element 30 is used as a sensor of polishing amount in order to determine the height dimension (the Y-axial dimension) of the MR element 15.

As mentioned above, in the present embodiment, the thin film magnetic head is configured in such a manner that, on the substrate 11, the recording-medium-facing-surface 11S is provided and the resistive film pattern 18B is disposed side by side with the MR element 15 in the track-width direction with a similar configuration to the magnetic bias layer 18A. As a result, highly precise polishing work is available when determining the height dimension (dimension in the direction orthogonal to the recording-medium-facing-surface 11S) of the MR element 15 in the course of manufacturing.

Next, a method of manufacturing the thin film magnetic head 1 will be described with reference to FIGS. 8 to 24 as one embodiment of the present invention. The method of manufacturing the thin film magnetic head 1 in the present embodiment includes three main production steps: namely, an arraying step in which a plurality of thin film magnetic heads 1, each of which includes an MR element 15, the magnetic bias layer 18A, the resistive film pattern 18B, etc., are arrayed on a wafer 110; a step of dividing the wafer 110 into a plurality of sections to form a bar; and a polishing step in which the recording-medium-facing-surface 11S is formed by polishing the MR element 15 together with the conductive pattern 18B in the direction of +Y along the height direction (the Y-axial direction) orthogonal to the width direction (the X axial direction) to a given terminal point. Hereafter, details will be described.

Figure 8:
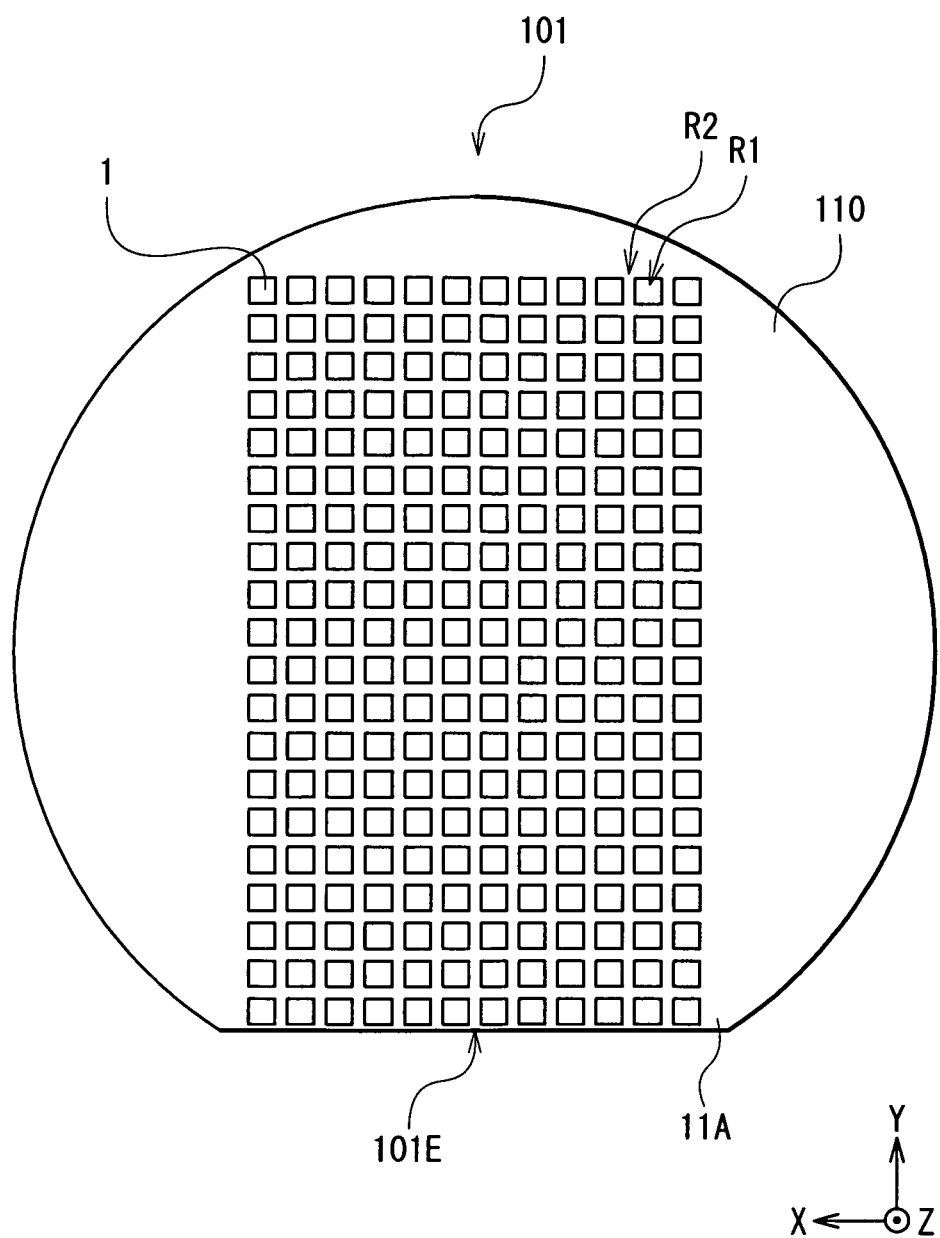
FIG. 8 is a plan view showing a configuration of a thin film magnetic heads integrated substrate, which is formed in the course of manufacturing the thin film magnetic head of FIG. 1.

FIG. 8 shows a planar configuration (on XY plane) of the thin film magnetic head integrated substrate 101, which is formed by arraying a plurality of thin film magnetic heads 1 on the wafer 110 in the arraying step. In the arraying step, the wafer 110 typically made of a ceramic material such as an Altic ($Al_2O_3$.TiC) is prepared, then, as shown in FIG. 8, the plurality of thin film magnetic heads 1 are arranged at an interval in matrix on the surface (the element formation face 11A) of the wafer 110. The wafer 110, which is a substrate for supporting the plurality of thin film magnetic heads 1, is nearly discoid in shape but partially including a straight portion (orientation flat 101E) on the outer circumference of the wafer for the purpose of orientation checking. Here, on the element formation faces 11A, rectangular areas which will finally become sliders 2A provided with the thin film magnetic head 1 are referred to as a first area R1, and gap areas between the adjacent first areas R1 is referred to as a second area R2. Though FIG. 8 shows the case where the thin film magnetic heads 1 are arrayed in a 20 rows 12 columns matrix as one example, arrangement is not limited to this and may be designed arbitrarily on the element formation face 11A. Here, the term "row" refers to an array of the thin film magnetic heads 1 in the widthwise direction (X-axial direction), and the term "line" refers to an array of the thin film magnetic heads 1 in the lengthwise direction (Y-axial direction).

Figure 9:
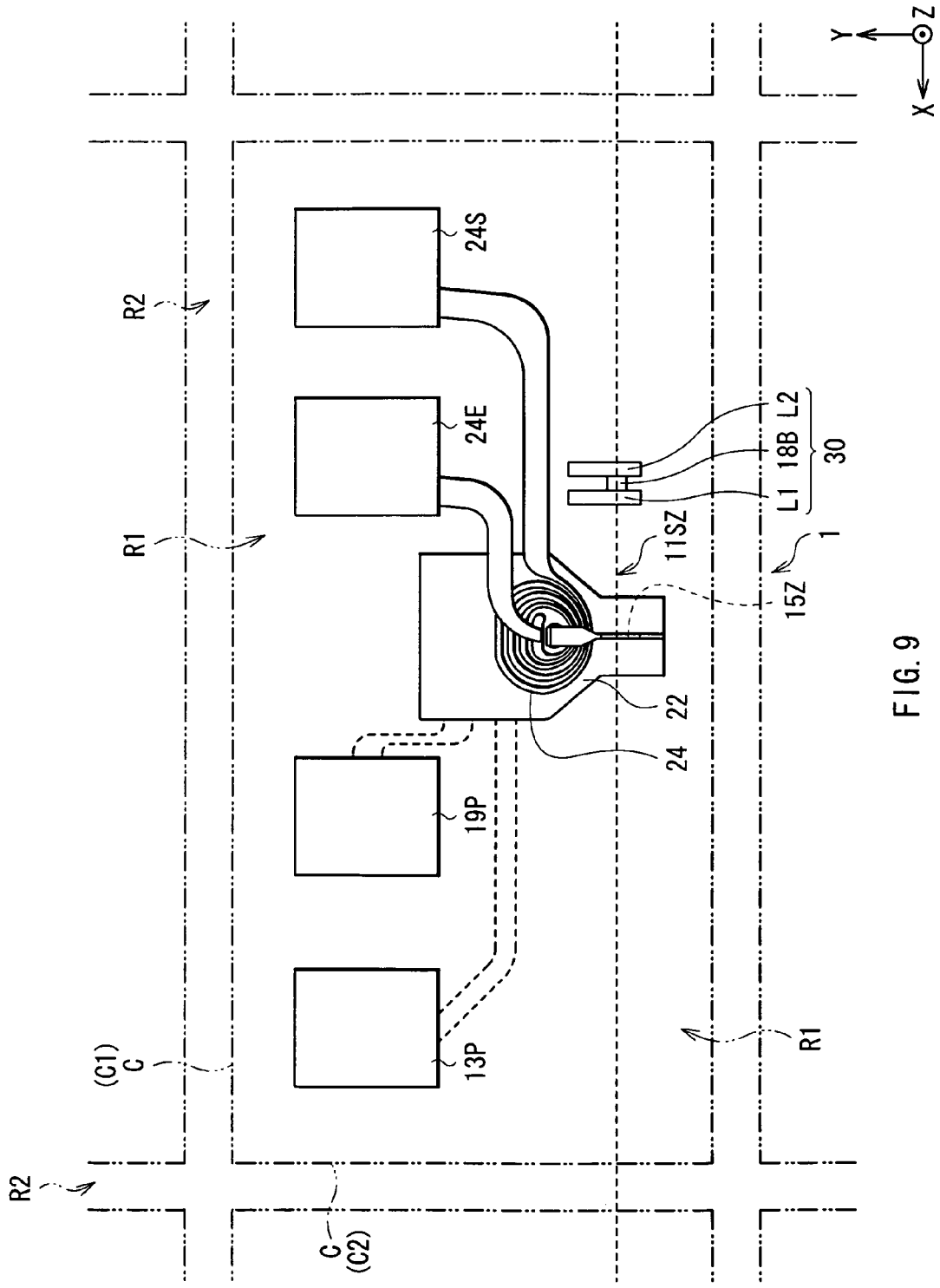
FIG. 9 is a partially-enlarged plan view which shows an enlarged portion of the thin film magnetic head integrated substrate of FIG. 8.

FIG. 9 is a partially-enlarged plan view partially showing an enlarged portion of the thin film magnetic head integrated substrate 101 of FIG. 8, in which any one of the first areas R1 and surrounding second area R2 are picked-up arbitrarily and enlarged. In FIG. 9, the two-dot chain line represents a section line C along which the wafer 110 should be cut in the course of manufacturing the thin film magnetic heads 1. In particular, a line segment extending along the widthwise direction (in the X axial direction) is referred to as section line C1 and a line segment extending along the lengthwise direction (the Y axial direction) is referred to as section line C2. Therefore, the first area R1 corresponds to a portion which will become the substrate 11 of the slider 2A, and the second area R2 is a surplus portion as a margin for cutting. The broken line extending in the X axial direction represents a terminal point 11S which is the end of the polishing work when forming the recording-medium-facing-surface 11S. In the present embodiment, the resistive film pattern 18B in the RLG element 30 is formed collectively with the MR element 15 on the terminal line 11SZ in the first area R1. It is to be noted that the RLG element 30 may be disposed in the second area R2. In this case, the RLG element 30 is prevented from being finally remained on the substrate 11 of the slider 2A. However, it is preferred to dispose the RLG element 30 closer to the MR film 15Z in the first area R1 as shown in FIG. 9 because that further improves the precision of polishing work.

Figure 10A:
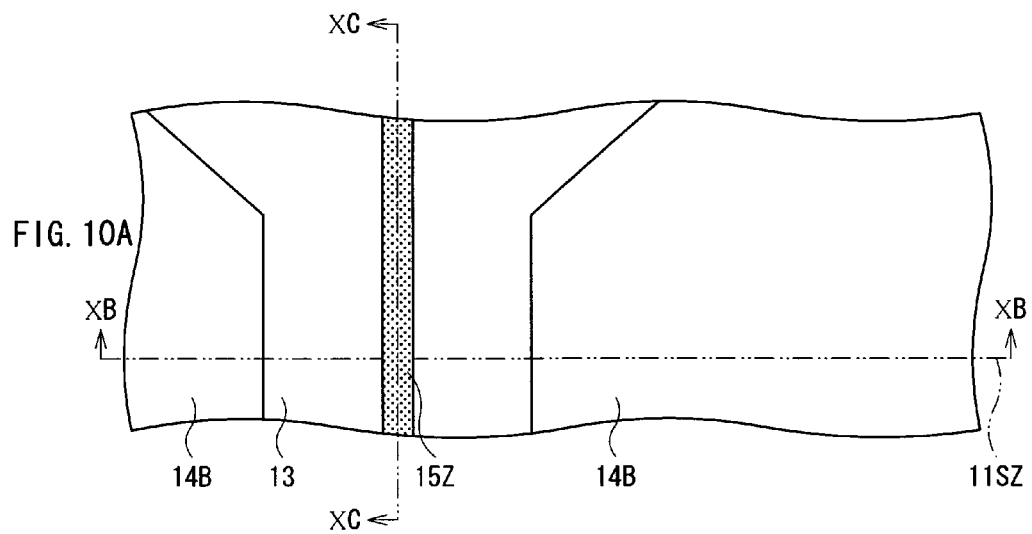
FIG. 10A is a principal portion plan view showing one production step in the method of manufacturing the thin film magnetic head of FIG. 1.
Figure 10B:
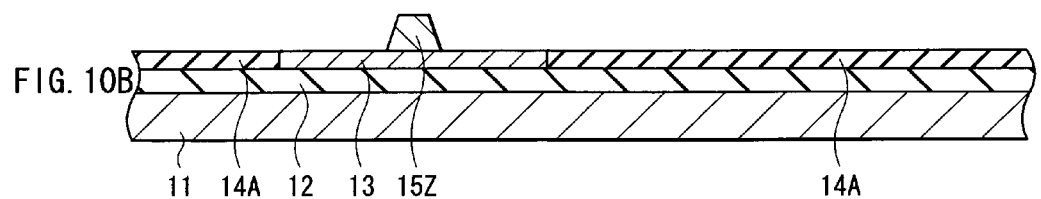
FIG. 10B is a first principal portion sectional view corresponding to the principal portion plan view of FIG. 10A.
Figure 10C:
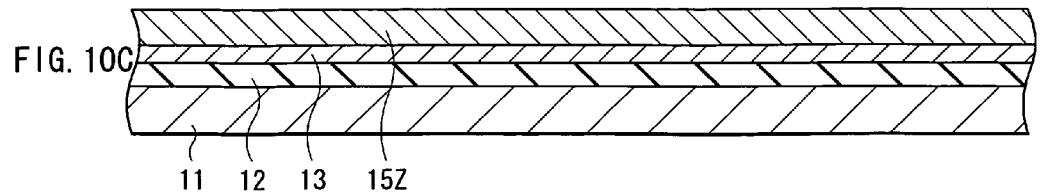
FIG. 10C is a second principal portion sectional view corresponding to the principal portion plan view of FIG. 10A.

Subsequently, more detailed step of forming the MR element 15 and the RLG element 30 will be described. FIG. 10A is a principal portion plan view corresponding to FIG. 4, and FIGS. 10B and 10C show sectional configurations taken along the lines XB-XB and XC-XC of FIG. 10A respectively. Here, the line XB-XB corresponds to the terminal line 11SZ. It is to be noted that the same is true for FIGS. 11 to 21 hereinbelow.

First, as shown in FIGS. 10A to 10C, the insulating layer 12 is formed so as to cover the whole surface of the wafer 110, which will become the substrate 11 later, by a sputtering process or the like. Here, it is desirable that it is made of $Al_2O_3$ or $SiO_2$ and formed to the thickness of 0.1 to 5.0 μm. Subsequently, the bottom shielding layer 13 is selectively formed by a frame plating process or the like so that a specified area including a planned formation area for the MR element 15 may be covered. Examples of the component material for the bottom shielding layer 13 include not only NiFe but also cobalt iron nickel alloy (CoFeNi), cobalt iron alloy (CoFe), iron nitride (FeN) and iron zirconium nitride (FeZrN). Subsequently, the insulating layer 14A surrounding the bottom shielding layer 13 is formed to a height so that the upper surface thereof may have a flat upper surface common to that of the bottom shielding layer 13. More specifically, the insulating layer 14A is formed at first by sputtering or the like so as to cover a part of the surface of the insulating layer 12 where the bottom shielding layer 13 is not formed, then, it is planarized by a CMP (Chemical Mechanical Polishing) process or the like. Further, after forming the MR film 15Z so as to cover the whole surface or a given portion, the MR film 15Z is patterned to determine its dimension in the track-width direction (the X axial direction). The MR film 15Z is formed by stacking the foundation layer 41, the first ferromagnetic layer 42, the first non-magnetic layer 43, the second ferromagnetic layer 44, the second non-magnetic layer 45 and the third ferromagnetic layer 46 in order, typically by sputtering for example.

Figure 11A:
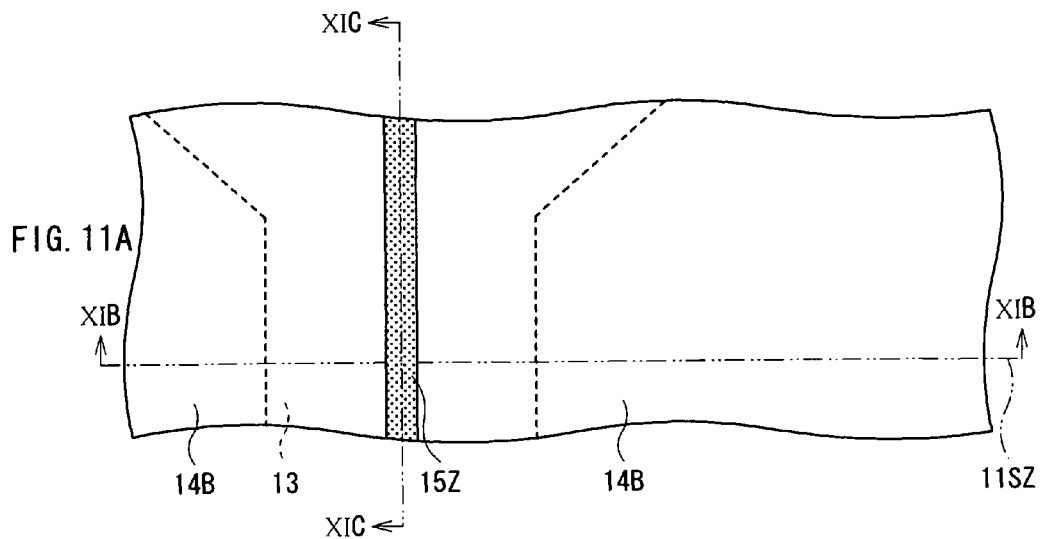
FIG. 11A is a principal portion plan view of a step subsequent to FIG. 10A.
Figure 11B:
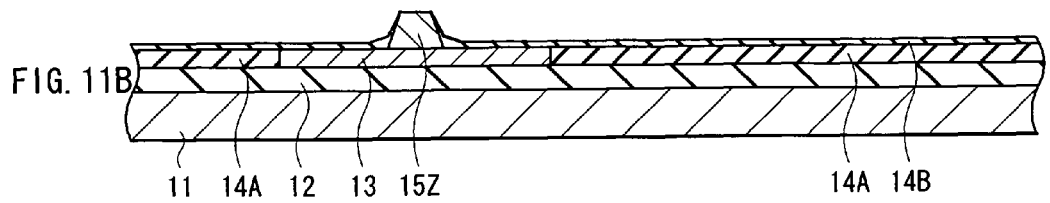
FIG. 11B is a first principal portion sectional view corresponding to the principal portion plan view of FIG. 11A.
Figure 11C:
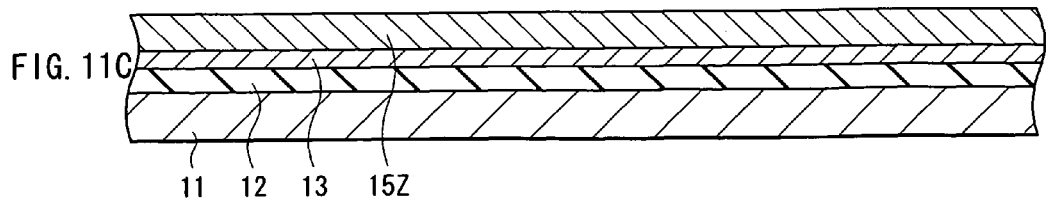
FIG. 11C is a second principal portion sectional view corresponding to the principal portion plan view of FIG. 11A.

Next, as shown in FIGS. 11A to 11C, the insulating layer 14B is formed so as to cover the flat face common to both of the bottom shielding layer 13 and the insulating layer 14A and end faces of the MR film 15Z.

Further, as shown in FIGS. 12A to 12C, the cap layer 16 is formed so as to cover the whole surface. However, the cap layer 16 does not cover a planned formation area for the resistive film pattern 18B thereby having an opening 16K in the cap layer 16.

Figure 13A:
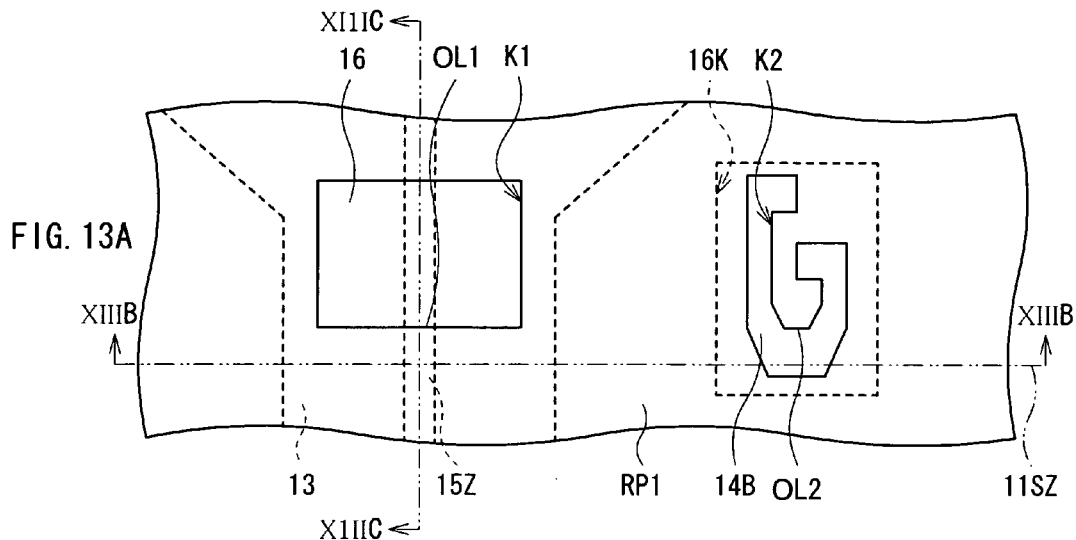
FIG. 13A is a principal portion plan view of a step subsequent to FIG. 12A.
Figure 13B:
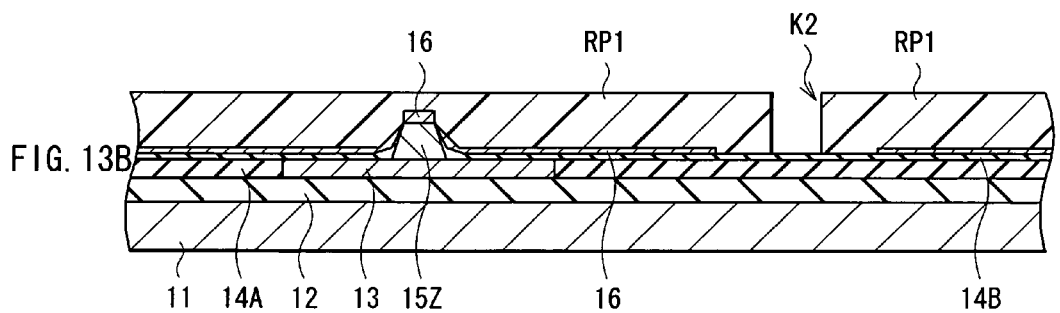
FIG. 13B is a first principal portion sectional view corresponding to the principal portion plan view of FIG. 13A.
Figure 13C:
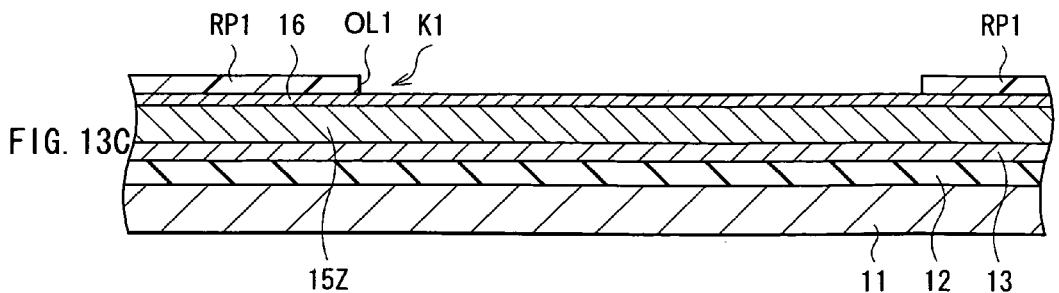
FIG. 13C is a second principal portion sectional view corresponding to the principal portion plan view of FIG. 13A.

Subsequently, as shown in FIGS. 13A to 13C, a photoresist pattern RP1 (mask pattern), which has openings K1 and K2 formed collectively in a given portion thereof by photolithography etc., is formed. More specifically, after forming a photosensitive photoresist layer (not shown) so as to cover at least the MR film 15Z, the openings K1 and K2 are formed collectively in a given position through exposure and development. Here, "formed collectively" means that, when exposing the photoresist layer, the opening K1 and the opening K2 are formed simultaneously or sequentially using a mask which is configured to have openings corresponding to both of the openings K1 and K2. The opening K1 and the opening K2 are located side by side along the track-width direction (the X axial direction). The opening K1 includes an outline OL1 extending across the MR film 15Z in the track-width direction, and the opening K2 includes an outline OL2 extending in the track-width direction and located at a given interval (including zero interval), as measured in a direction orthogonal to the track-width direction (the Y-axial direction), from the outline OL1. These outlines OL1 and OL2 partially constituting the openings K1 and K2 have a function to define the rear end positions for the respective MR film 15Z and the resistive film pattern 18B, which will be formed later. The opening K2 is formed to include the terminal line 11SZ, which will become the recording-medium-facing-surface 11S later.

After forming the photoresist pattern RP1, an exposed portion of the cap layer 16 and the MR film 15Z, which is exposed corresponding to the opening K1, is selectively removed by a milling process using the photoresist pattern RP1 as a mask. In this manner, a rear end face 15SB which is defined corresponding to the outline OL1 is formed in the MR film 15Z as shown in FIGS. 14A to 14C.

Figure 15A:
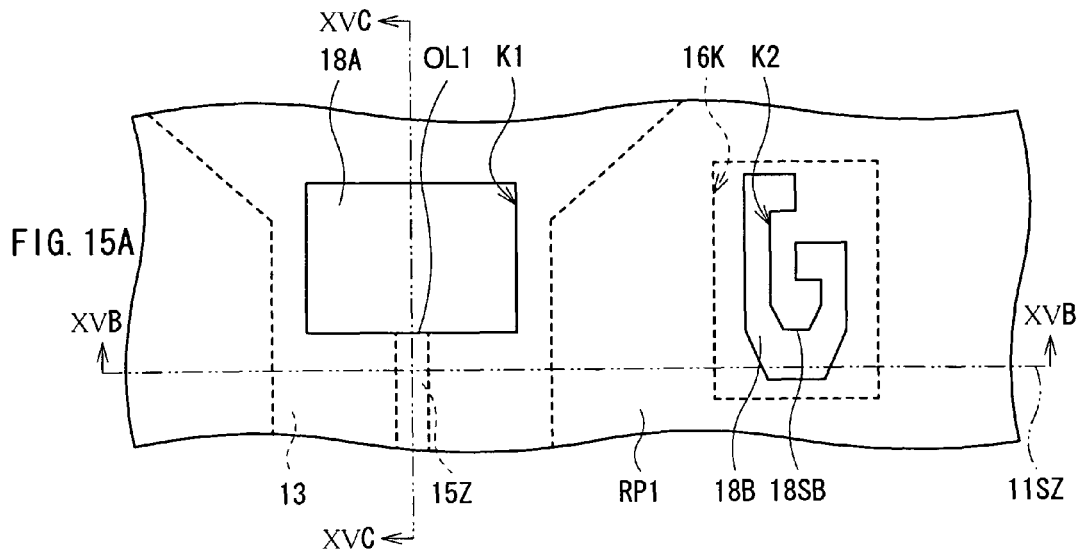
FIG. 15A is a principal portion plan view of a step subsequent to FIG. 14A.
Figure 15B:
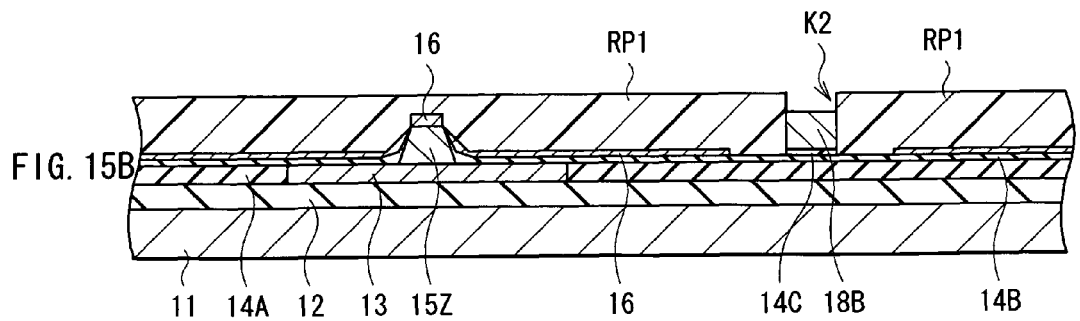
FIG. 15B is a first principal portion sectional view corresponding to the principal portion plan view of FIG. 15A.
Figure 15C:
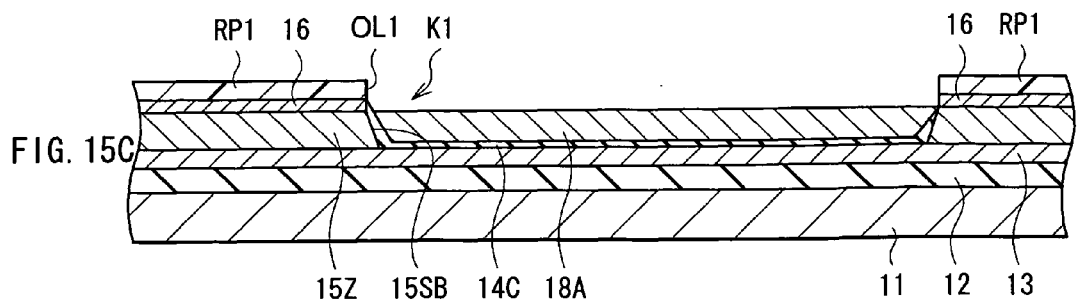
FIG. 15C is a second principal portion sectional view corresponding to the principal portion plan view of FIG. 15A.

Subsequently, the insulating layer 14C and the magnetic bias layer 18A are formed so as to fill the portion corresponding to the opening K1 (the area where the cap layer 16 and the MR film 15Z were removed) and the insulating layer 14C and the resistive film pattern 18B are formed in a portion corresponding to the opening K2 in order. In this process, a rear end face 18SB corresponding to the outline OL2 is naturally formed in the resistive film pattern 18B as shown in FIGS. 15A to 15C. It is preferred that the height of the resistive film pattern 18B in the thickness direction (the Z-axial direction) is aligned with at least a part of the MR element 15 on a stacking plane (XY plane). Further, it is preferred that the resistive film pattern 18B is configured together with and similar to the magnetic bias layer 18A using the same component materials. Thus, since the resistive film pattern 18B is formed in this manner, the precision in the subsequent polishing process for manufacturing the recording-medium-facing-surface 11S will improve more, and height dimension with high precision is available for the MR element 15.

Figure 16A:
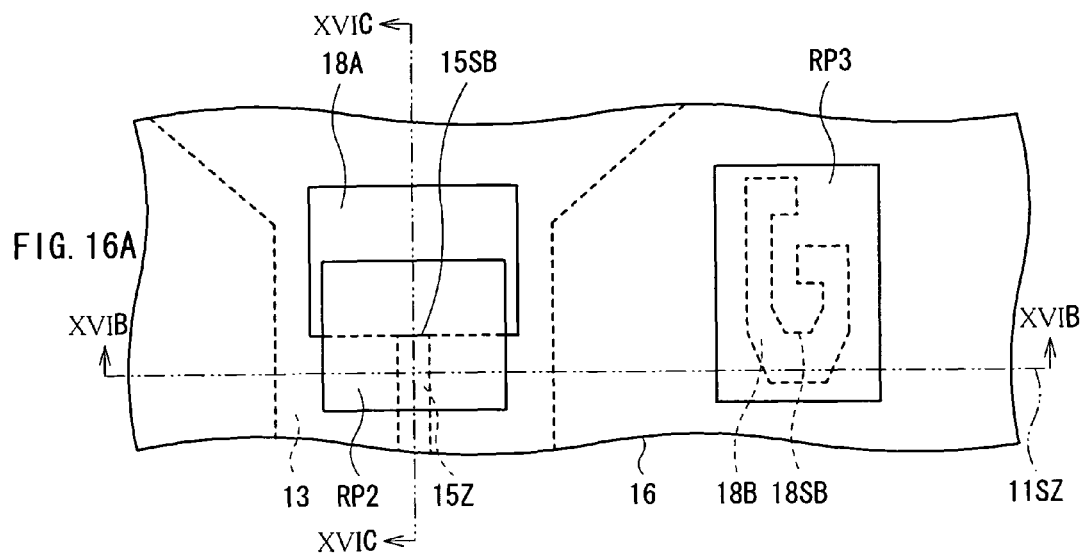
FIG. 16A is a principal portion plan view of a step subsequent to FIG. 15A.
Figure 16B:
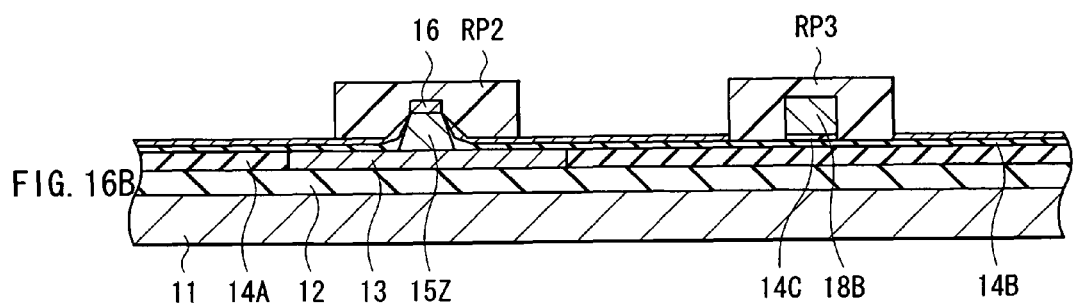
FIG. 16B is a first principal portion sectional view corresponding to the principal portion plan view of FIG. 16A.
Figure 16C:
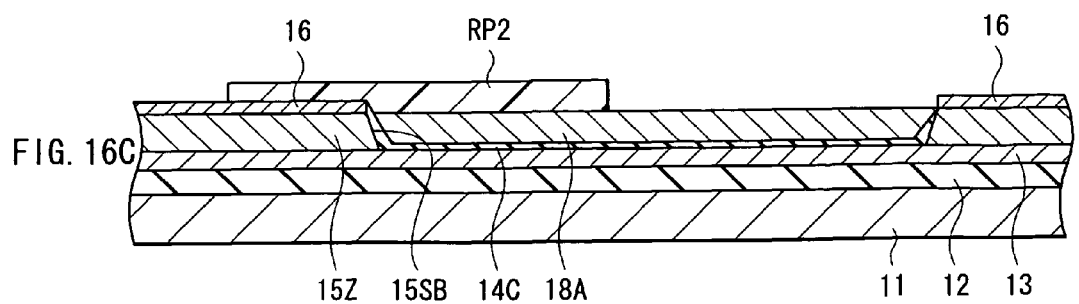
FIG. 16C is a second principal portion sectional view corresponding to the principal portion plan view of FIG. 16A.

Then, the photoresist pattern RP1 is removed and a photoresist pattern RP2 which covers a part of the cap layer 16 on the MR film 15Z and a part of the magnetic bias layer 18A, and a photoresist pattern RP3 which covers the resistive film pattern 18B and a part of the insulating layer 14B around the resistive film pattern 18B are formed as shown in FIGS. 16A to 16C.

Thus an exposed portion of the cap layer 16 is selectively removed by a milling process or the like using these photoresist patterns RP2 and RP3 as a mask. After that, an insulating layer 14D is formed to fill a portion where the cap layer 16 has been removed as shown in FIGS. 17A to 17C.

Figure 18A:
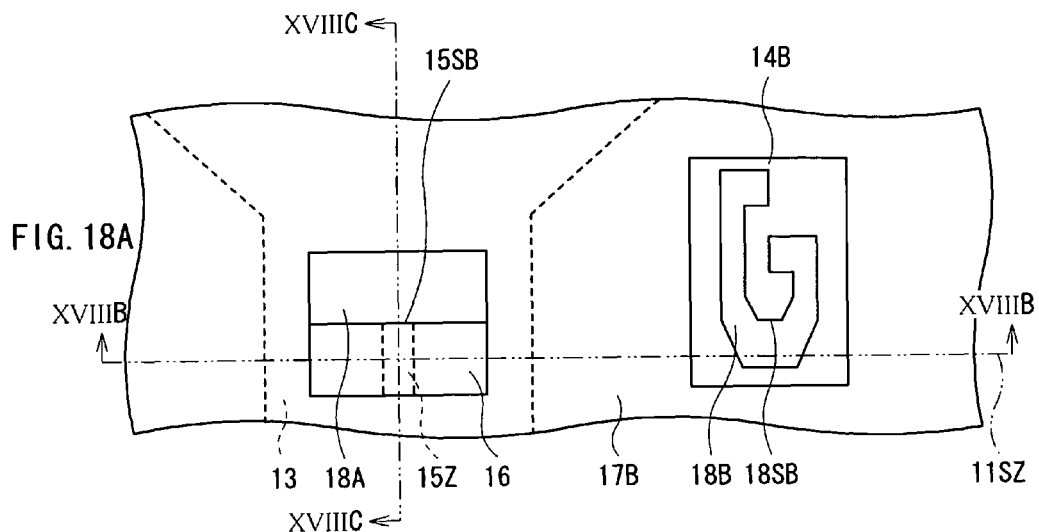
FIG. 18A is a principal portion plan view of a step subsequent to FIG. 17A.
Figure 18B:
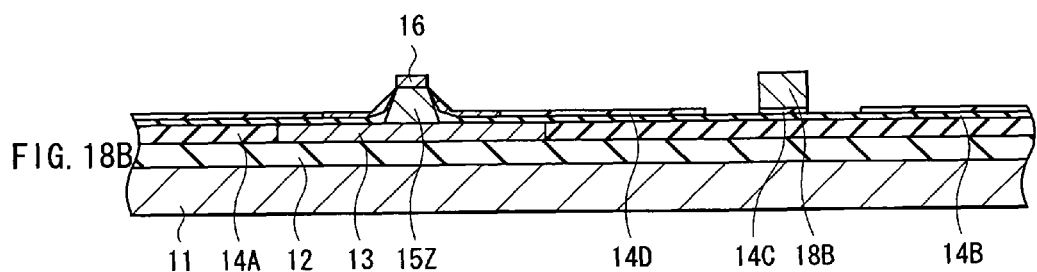
FIG. 18B is a first principal portion sectional view corresponding to the principal portion plan view of FIG. 18A.
Figure 18C:
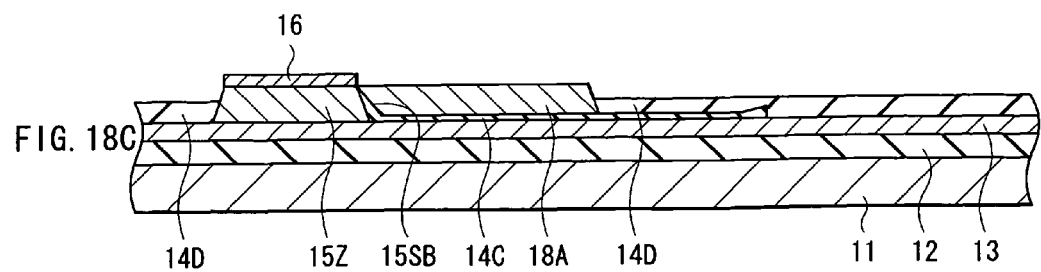
FIG. 18C is a second principal portion sectional view corresponding to the principal portion plan view of FIG. 18A.

Subsequently, after lifting off the photoresist pattern RP2 and RP3 as shown in FIGS. 18A to 18C, an insulating layer 14E is formed to cover the whole surface as shown in FIGS. 19A to 19C. Further, a planarizing procedure is applied to the whole surface by a CMP process or the like until both of the upper surface of the cap layer 16 that covers the MR film 15Z and the resistive film pattern 18B are exposed as shown in FIGS. 20A to 20C.

After the planarizing procedure, the top shielding layer 19 is formed in an area opposed to the bottom shielding layer 13 by a frame plating process or the like, in such a manner as to be in contact with the upper surface of the cap layer 16 that covers the MR film 15Z, as shown in FIGS. 21A to 21C. Thus, formation of the read head portion 1A is generally completed. On the other hand, a pair of leads L1 and L2 are provided so as to be partially in contact with the upper surface of the resistive film pattern 18B. Of the resistive film pattern 18B, a portion sandwiched between the pair of leads L1 and L2 in the track-width direction functions as a resistance sensor. Alternatively, instead of applying the planarizing procedure to the whole, the insulating layer 14E may have openings with a given dimension respectively corresponding to the cap layer 16 which covers the MR film 15Z and the resistive film pattern 18B so that the top shielding layer 19 and the pair of leads L1 and L2 are provided therein.

Figure 22:
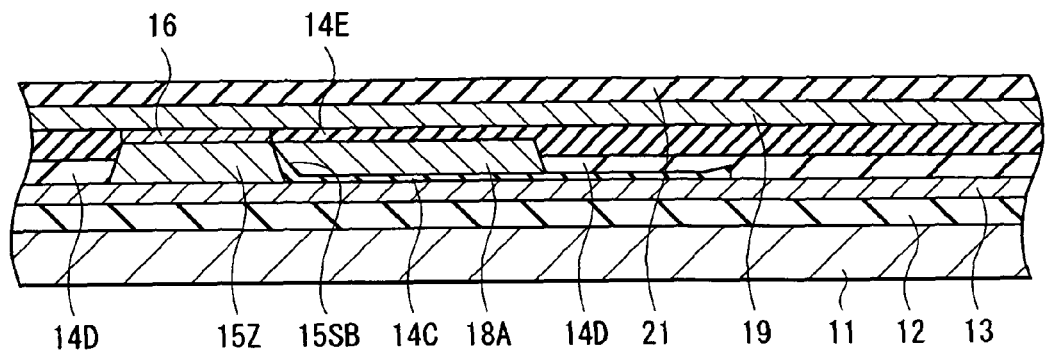
FIG. 22 is a principal portion sectional view of a step subsequent to FIG. 21A.
Figure 23:
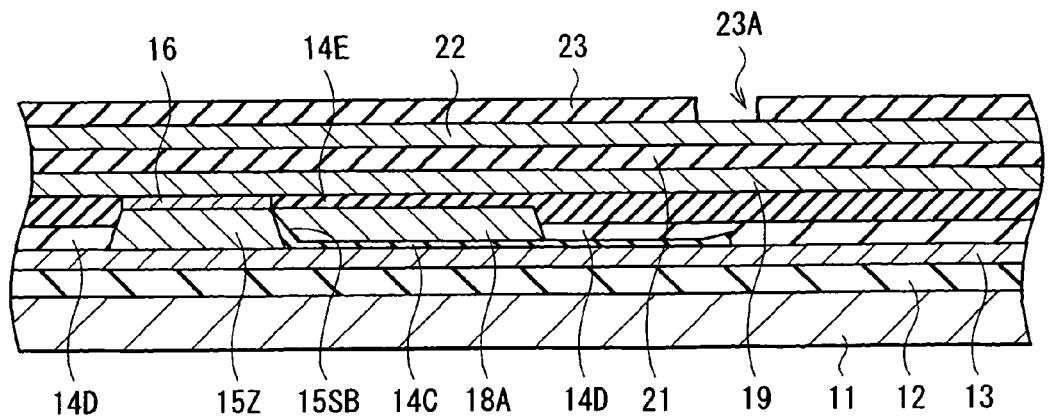
FIG. 23 is a principal portion sectional view of a step subsequent to FIG. 22.

Subsequently, after forming the insulating layer 21 to the thickness of 10 nm to 50 nm for example by a sputtering process or CVD process so as to cover the whole surface as shown in FIG. 22, the lower magnetic pole 22 is formed on the insulating layer 21 to the thickness of 0.5 to 3.0 μm for example by a frame plating process, as shown in FIG. 23. Here, CoFeNi, CoFe, FeN, or FeZrN as well as NiFe may be used. Further, the write gap layer 23 which has the opening 23A is formed so that the lower magnetic pole 22 may be selectively covered. Here, it is typically formed to the thickness of 10 nm to 50 nm by a sputtering process or a CVD process.

Figure 24A:
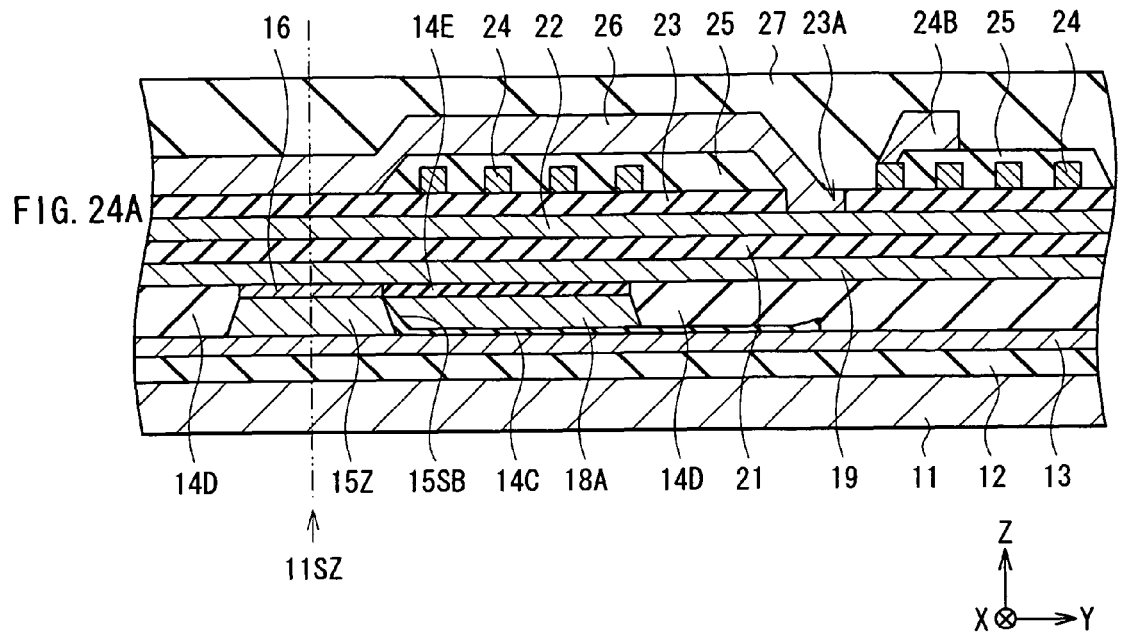
FIG. 24A is a principal portion sectional view of a step subsequent to FIG. 23.

After forming the write gap layer 23, the coil 24 is formed by a frame plating process to the thickness of 1 to 5 μm for example as shown in FIG. 24A. Further, after forming the insulating layer 25 so as to partially cover the coil 24, the upper magnetic pole 26, which covers the insulating layer 25 and is magnetically connected to the lower magnetic pole 22, is formed. In addition, the coil lead 24B is formed so as to be connected to an exposed portion of the coil 24 not covered with the insulating layer 25. Here, the insulating layer 25 is formed to the thickness of 0.5 to 7.0 μm for example by exposing only a given portion of a photoresist and heating it (curing). It is preferred that the upper magnetic pole 26 and the coil lead 24B are formed by a frame plating process.

Figure 24B:
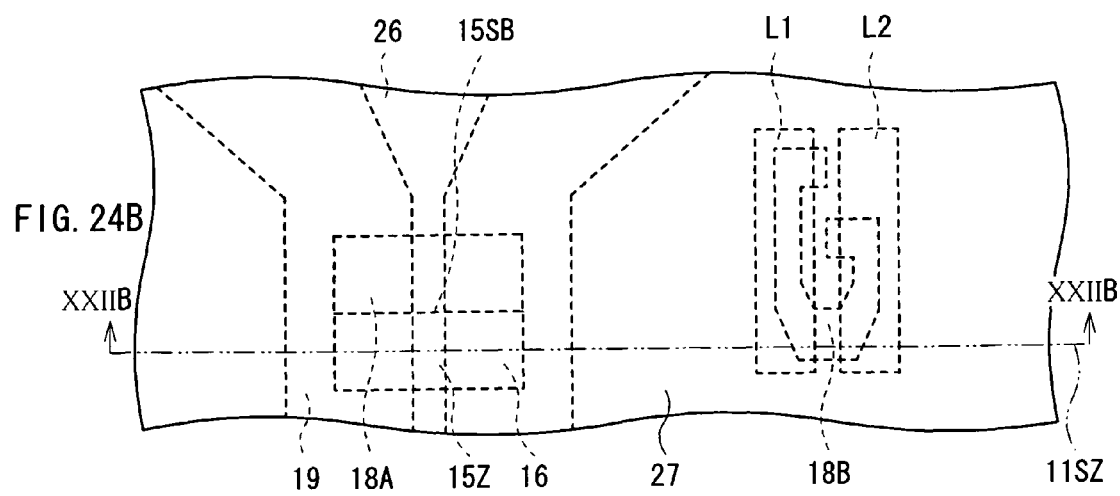
FIG. 24B is a principal portion plan view corresponding to the principal portion sectional view of FIG. 24A.

Finally, the protective film 27 is formed to cover the whole surface including the upper magnetic pole 26 by a sputtering process or the like as shown in FIGS. 24A and 24B, then a planarizing process is applied as necessary by a CMP process or the like. That is the end of the formation process for the write head portion 1B, thus the thin film magnetic head 1 is generally completed.

As described above, the thin film magnetic head integrated substrate 101 that includes the plurality of thin film magnetic heads 1 is formed and divided along the section line C1 shown in FIG. 9, thereby forming the bar (not illustrated) on which two or more of the thin film magnetic heads 1 are integrally arrayed in a row in the X axial direction.

After this, as already mentioned, the recording-medium-facing-surface 11S is formed by polishing the thin film magnetic head 1 arrayed on the bar to the terminal line 11SZ in the direction of +Y along the height direction orthogonal to the width direction (X axial direction) as shown in FIGS. 24A and 24B. As a result, the MR element 15 is formed. In this case, when the MR film 15Z and stacked end surface of the resistive film pattern 18B are polished together, the more polished, the smaller the dimension of the resistive film pattern 18B in the Y axial direction becomes so that the resistance between the leads L1 and L2 decreases gradually. Accordingly, a desired cross section in the terminal line 11SZ or the recording-medium-facing-surface 11S is obtainable with sufficient precision by stopping the polishing work at the time that the resistance becomes a predetermined value. In the present embodiment, since the openings K1 and K2 in the photoresist pattern RP1 are formed collectively, the relative position between the rear end face 15SB of the MR film 15Z and the rear end face 18SB of the resistive film pattern 18B is determined with high precision. Therefore, errors in the polishing amount at the time of polishing may be reduced so that the MR element 15 having a desired height dimension (MR height) is available.

Then, the thin film magnetic head 1 is completed by passing through the other specified steps such as cutting the bar along the section line C2 of FIG. 9.

According to the present embodiment, the photoresist pattern RP1, in which the opening K1 including the outline OL1 and the opening K2 including the outline OL2 are formed collectively therein, is used in manufacturing the thin film magnetic head 1 provided with the MR element 15. As a result, the rear end face 15SB of the MR element 15 and the rear end face 18SB of the resistive film pattern 18B may be determined with high precision. Accordingly, it is possible to manufacture the MR element 15 with a small margin of error in its MR height if the polishing amount is determined by monitoring the resistance variation in the resistive film pattern 18B in the course of the polishing process, which is applied to form the magnetic recording-medium-facing-surface 11S. Since the aforementioned photoresist pattern RP1 is used to collectively form the magnetic bias layer 18A and the resistive film pattern 18B in the respective areas corresponding to the opening K1 and corresponding to the opening K2 via the insulating layer 14C, production process is simplified compared with the case where the resistive film pattern 18B is formed in a separate process. That allows the MR height of the MR element 15 to be determined easily and with high precision, thereby enabling to form the thin film magnetic head 1 more simply and with higher reading performance.

In particular, since the MR element 15 and the resistive film pattern 18B are both configured to include a ferromagnetic layer made of a ferromagnetic material containing cobalt, the hardness of the MR element 15 and the resistive film pattern 18B becomes almost the same, thereby the dimension error in polishing may be further reduced.

Although the present invention has been described with reference to the above embodiments and some examples, the invention is not limited to the embodiments and examples but may be variously modified. For example, in the present embodiment, although the TMR element, which is constituted from the first to third ferromagnetic layers separated by the first and the second non-magnetic layers respectively, is taken as an example of the MR element, it is not limited to this and a CPP-GMR element may be used.

Figure 25:
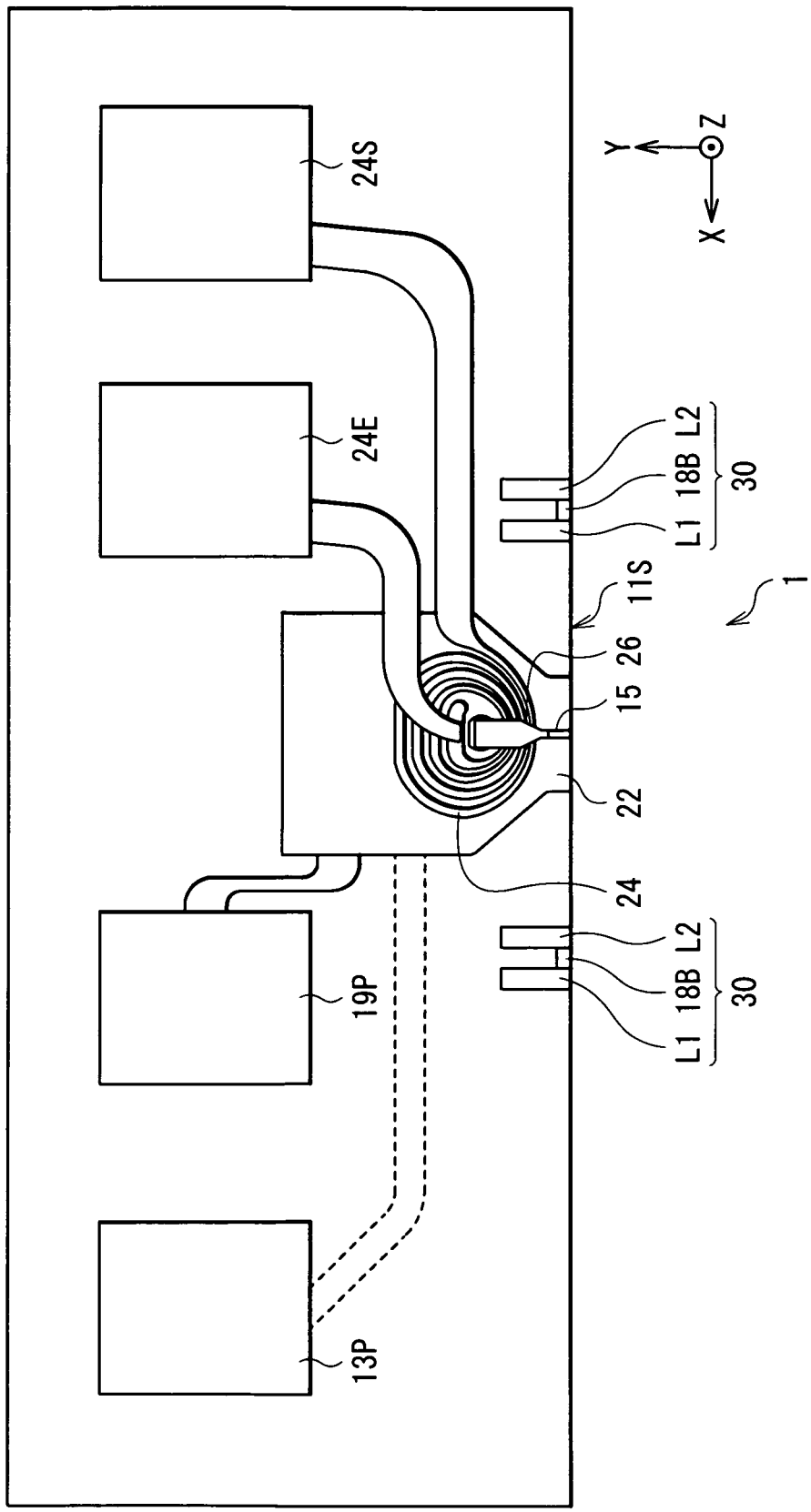
FIG. 25 is a plan view showing a modification of the thin film magnetic head appearing in FIG. 1.

Alternatively, although the RLG element 30 is prepared one to one with respect to the MR element 15 in the present embodiment, it is not limited to this and two or more RLG elements 30 may be installed with respect to the one MR element 15. In particular, when a pair of the RLG elements 30 are disposed with the MR element 15 in between in the track-width direction (X axial direction) along the recording-medium-facing-surface as shown in FIG. 25, it becomes possible to reduce errors at the time of processing and a polishing process with higher precision is available, thereby the reading performance of the MR element 15 is further improved.

In the above-mentioned embodiments, although the write head portion of longitudinal write system was taken as an example for description, the present invention is not limited to this and may also take a write head portion of vertical write system.

ASSOCIATION OF REFERENCE NUMERALS AND COMPONENT ELEMENTS IN THE PRESENT EMBODIMENTS IS SUMMARIZED AND SHOWN BELOW:

1: thin film magnetic head, 1A: read head portion, 1B: write head portion, 2: head gimbal assembly (HGA), 2: slider, 2B: suspension, 3. arm, 4: actuator, 5: fixed axle, 6: bearing, 7: spindle motor, 11: substrate, 11S: recording-medium-facing-surface (ABS), 12: insulating layer, 13: bottom shielding layer, 13P: electrode, 14 (14A-14E): insulating layer, 15: magnetoresistive (MR) element, 16: cap layer, 18A: magnetic bias layer, 19: top shielding layer, 19P: electrode, 21: insulating layer, 22: lower magnetic pole, 23: write gap layer, 23A: opening, 24: coil, 24A, 24B: coil lead, 24S, 24E: electrode, 25: insulating layer, 26: upper magnetic pole, 27: protective film, 30: RLG element, 18B: resistive film pattern, 41: foundation layer, 42: first ferromagnetic layer, 43: first non-magnetic layer, 44: second ferromagnetic layer, 45: second non-magnetic layer, 46: third ferromagnetic layer, 100: housing, 200: magnetic recording medium, 300: head arm assembly (HAA), 101: thin film magnetic head integrated substrate, 110: wafer.

What is claimed is:

1. A thin film magnetic head comprising:
a magnetoresistive element having a recording-medium-facing-surface which is to be faced with a magnetic recording medium;
a magnetic bias layer located on a side opposite to the recording-medium-facing-surface of the magnetoresistive element, and being capable of applying a bias magnetic field to the magnetoresistive element in a direction orthogonal to the recording-medium-facing-surface; and
a resistive film pattern having a recording-medium-facing-surface, the resistive film pattern being located side by side with the magnetoresistive element in a track-width direction,
at least one component material of the resistive film pattern and at least one component material of the magnetic bias layer being made of a same material.

2. The thin film magnetic head according to claim 1, wherein
the magnetoresistive element has a stacked structure including a first non-magnetic layer and a first and a second ferromagnetic layers opposed to each other in their thickness direction with the first non-magnetic layer in between; and
magnetization directions of the first and second ferromagnetic layers vary in response to application of external magnetic field, and stay antiparallel to each other in the absence of a magnetic field.

3. The thin film magnetic head according to claim 2 wherein the first non-magnetic layer contains one or more selected from the group consisting of copper (Cu), Silver (Ag), Gold (Au), Zinc (Zn), Ruthenium (Ru), Rhodium (Rh), and compounds thereof.

4. The thin film magnetic head according to claim 2 further comprising:
a third ferromagnetic layer which is disposed on the opposite side of the second ferromagnetic layer from the first ferromagnetic layer; and
a second non-magnetic layer which is disposed between the second ferromagnetic layer and the third ferromagnetic layer.

5. The thin film magnetic head according to claim 4, wherein the second non-magnetic layer is a tunnel barrier layer containing one or more selected from the group consisting of magnesium oxide (MgO), aluminum oxide (AlOx), zinc oxide (ZnO), titanium oxide (TiOx), and aluminium nitride (AlN).

6. The thin film magnetic head according to claim 4, wherein each of the magnetic bias layer and the resistive film pattern includes a ferromagnetic material layer containing cobalt, and each of the first to third ferromagnetic layers includes a ferromagnetic material containing cobalt.

7. The thin film magnetic head according to claim 1, wherein location of the resistive film pattern in film thickness direction is partially or fully overlapped with location of the magnetoresistive element in the track width direction.

8. The thin film magnetic head according to claim 1, further comprising another resistive film pattern provided on both sides of the magnetoresistive element in the track-width direction,
   at least one component material of the another resistive film pattern and at least one component material of the magnetic bias layer being made of a same material.

9. The thin film magnetic head according to claim 8, wherein
   the another resistive film pattern and the magnetic bias layer each have a single layer structure, the another resistive film pattern and the magnetic bias layer being made of a common component material.

10. The thin film magnetic head according to claim 8, wherein
    at least one of the another resistive film pattern and the magnetic bias layer has a multilayer structure, at least one component material being common between the another resistive film pattern and the magnetic bias layer.

11. A magnetic head slider comprising the thin film magnetic head as defined in claim 1 formed on a substrate.

12. A head gimbal assembly, comprising: a magnetic head slider having the thin film magnetic head as defined in claim 1 formed on a substrate; and a suspension having an end on which the magnetic head slider is attached.

13. A head arm assembly comprising: a magnetic head slider having the thin film magnetic head as defined in claim 1 formed on a substrate; a suspension having the magnetic head slider attached to one end thereof; and an arm supporting the other end of the suspension.

14. A magnetic disk device, comprising a magnetic recording medium and a head arm assembly,
    the head arm assembly including:
       a magnetic head slider having the thin film magnetic head as defined in claim 1 formed on a substrate; a suspension having the magnetic head slider attached to one end thereof; and
       an arm supporting the other end of the suspension.

15. The thin film magnetic head according to claim 1, wherein
    the resistive film pattern and the magnetic bias layer each have a single layer structure, the resistive film pattern and the magnetic bias layer being made of a common component material.

16. The thin film magnetic head according to claim 1, wherein
    at least one of the resistive film pattern and the magnetic bias layer has a multilayer structure, at least one component material being common between the resistive film pattern and the magnetic bias layer.

* * * * *